United States Patent
Lee et al.

(10) Patent No.: US 10,057,766 B2
(45) Date of Patent: Aug. 21, 2018

(54) METHODS AND SYSTEMS FOR AUTHENTICATION INTEROPERABILITY

(71) Applicant: QUALCOMM Incorporated, San Diego, CA (US)

(72) Inventors: Soo Bum Lee, San Diego, CA (US); George Cherian, San Diego, CA (US); Abhishek Pramod Patil, San Diego, CA (US); Santosh Paul Abraham, San Diego, CA (US); Jouni Malinen, Tuusula (FI)

(73) Assignee: QUALCOMM Incorporated

( * ) Notice: Subject to any disclaimer, the term of this patent is extended or adjusted under 35 U.S.C. 154(b) by 283 days.

(21) Appl. No.: 14/918,470

(22) Filed: Oct. 20, 2015

(65) Prior Publication Data

US 2016/0112869 A1    Apr. 21, 2016

Related U.S. Application Data

(60) Provisional application No. 62/066,796, filed on Oct. 21, 2014.

(51) Int. Cl.
| | |
|---|---|
| H04W 12/06 | (2009.01) |
| H04W 12/04 | (2009.01) |
| H04L 29/06 | (2006.01) |

(52) U.S. Cl.
CPC .......... H04W 12/04 (2013.01); H04L 63/08 (2013.01); H04W 12/06 (2013.01); H04L 63/061 (2013.01)

(58) Field of Classification Search
None
See application file for complete search history.

(56) References Cited

U.S. PATENT DOCUMENTS 5,953,420 A * 9/1999 Matyas, Jr. ........... H04L 9/0844
                                                          380/285
9,143,937 B2 * 9/2015 Cherian .............. H04L 63/0815
(Continued)

FOREIGN PATENT DOCUMENTS

| WO | WO-2010078492 A2 | 7/2010 |
| WO | WO-2013003535 A1 | 1/2013 |

OTHER PUBLICATIONS

X. Zheng and B. Sarikaya, "Handover keying and its uses," in IEEE Network, vol. 23, No. 2, pp. 27-34, Mar. 2009. (Year: 2009).*

(Continued)

Primary Examiner — Michael R Vaughan
(74) Attorney, Agent, or Firm — Knobbe, Martens, Olson & Bear, LLP

(57) ABSTRACT

Systems, methods, and computer readable mediums for authenticating a device perform a method of receiving, at a second device, a first authentication protocol reauthentication response for the device, the authentication response including a reauthentication master session key (rMSK), transmitting, at the second device, a second first authentication protocol reauthentication response to a first access point based on the reauthentication master session key, generating, at the second device, a first pairwise master key (PMK) based on the reauthentication master session key, generating, at the second device, a key message to include the first pairwise master key, and transmitting, at the second device, the key message to the second access point.

26 Claims, 13 Drawing Sheets

(56) References Cited

U.S. PATENT DOCUMENTS

| | | | |
|---|---|---|---|
| 9,961,545 B2* | 5/2018 | Timariu | H04W 12/06 |
| 2008/0072047 A1* | 3/2008 | Sarikaya | H04L 9/32 |
| | | | 713/171 |
| 2008/0285749 A1 | 11/2008 | Suh et al. | |
| 2009/0170476 A1* | 7/2009 | Lin | H04L 63/0823 |
| | | | 455/411 |
| 2010/0281249 A1* | 11/2010 | Das | H04L 9/0838 |
| | | | 713/151 |
| 2011/0047382 A1 | 2/2011 | Wang et al. | |
| 2013/0145149 A1* | 6/2013 | Tanaka | H04L 9/0838 |
| | | | 713/155 |
| 2013/0243194 A1* | 9/2013 | Hawkes | H04L 63/067 |
| | | | 380/270 |
| 2013/0247150 A1* | 9/2013 | Cherian | H04L 63/0815 |
| | | | 726/4 |
| 2013/0298209 A1* | 11/2013 | Targali | H04L 63/0815 |
| | | | 726/6 |
| 2016/0127903 A1* | 5/2016 | Lee | H04W 36/00 |
| | | | 713/171 |
| 2018/0084416 A1 | 3/2018 | Lee et al. | |

OTHER PUBLICATIONS

Egners A., et al., "Secure and Efficient Handover Protocols for WMNs," 2013 IEEE 14th International Symposium on a World of Wireless, Mobile and Multimedia Networks (WOWMOM), IEEE, Jun. 4, 2013 (Jun. 4, 2013), pp. 1-7, XP032478090, DOI: 10.1109/WOWMOM.2013.6583410 ISBN: 978-1-4673-5827-9 [retrieved on Aug. 20, 2013].

Dwyer J., et al., "Impact of Handoff Delay on Radius Enabled 802.11 WLANs," Proceedings of IEEE Southeastcon, Mar. 17, 2011 (Mar. 17, 2011), pp. 136-141, XP031943041, DOI: 10.1109/SECON.2011.5752921 ISBN: 978-1-61284-739-9.

International Search Report and Written Opinion—PCT/US2015/056718—ISA/EPO—dated Oct. 24, 2016.

Nomura R., et al., "Evaluation of EAP Based Re-Authentication Protocol for High-Speed Vehicular Handover in Cognitive Radio Networks", 2nd International Conference on Cognitive Radio Oriented Wireless Networks and Communications, CROWNCOM 2007, IEEE, Piscataway, NJ, USA, Aug. 1, 2007, pp. 549-553, XP031276110, ISBN: 978-1-4244-0814-6.

Partial International Search Report—PCT/US2015/056718—ISA/EPO—dated Jul. 14, 2016.

Tabassam A.A., et al., "Fast and Seamless Handover for Secure Mobile Industrial Applications with 802.11r", IEEE $5^{th}$ International Workshop on Performance and Management of Wireless and Mobile Networks (P2MNET 2009); Zurich, Switzerland, Oct. 20, 2009, pp. 750-757, XP031581410, ISBN: 978-1-4244-4488-5.

Yao G., et al., "Secured Fast Handoff in 802.11-Based Wireless Mesh Networks for Pervasive Internet Access", IEICE Transactions on Information and Systems, Information & Systems Society, Tokyo, JP, vol. E93D, No. 3, Mar. 1, 2010 (Mar. 1, 2010), pp. 411-420, XP001554146, ISSN: 0916-8532, DOI: 10.1587/TRANSINF.E93.D.411.

\* cited by examiner

METHODS AND SYSTEMS FOR AUTHENTICATION INTEROPERABILITY

CROSS-REFERENCE TO RELATED APPLICATIONS

This application claims priority to U.S. Provisional Application No. 62/066,796, filed Oct. 21, 2014, and entitled "METHODS AND SYSTEMS FOR AUTHENTICATION INTEROPERABILITY." The disclosure of this prior application is considered part of this application, and is hereby incorporated by reference in its entirety.

BACKGROUND

Field

The present application relates generally to wireless communication systems and more specifically to systems, methods, and devices for authentication within wireless communication systems.

Background

In Wi-Fi networking applications, security features have gradually evolved to provide more robust and better integrated security tools. In the EAP (Extensible Authentication Protocol) standard of 802.11, promulgated by the Institute of Electrical and Electronics Engineers (IEEE), an authentication technique including a mechanism referred to as a "4-Way handshake" can be used. In the 4-Way handshake mechanism, a client device such as a laptop computer, smartphone, or other client device, generally referred to as a "station," negotiates with a wireless router or other device, generally referred to as an "access point," to establish a secure networking session. During the session, the station may seek a connection to the Internet or other networks In the 4-Way handshake approach, the station and access point exchange a series of four defined messages, based on which mutual authentication can be carried out. The access point can interact with a remote authentication dial in user service (RADIUS) server or other authentication server, a platform, or a service to establish a set of shared secrets and/or public and private keys that are used by the station and access point to execute the 4-Way handshake procedure. As part of the 4-Way handshake procedure, the station and access point can access a shared secret, which can include a pair Wise master key (PMK). Messages exchanged between the station and the access point can be encoded using further sets of public and private keys, including a transient pairwise key (PTK), which can be constructed using the pair-wise master key as a generator for further encryption key layers.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

Some aspects of the disclosure provide for interoperability between at least portions of two different authentication methods. For example, in some aspects, a first authentication method may provide some benefits over a second authentication method. However, the second authentication method may be widely deployed, while the first authentication method has not yet been deployed. Additionally, deployment of the first authentication method may be delayed due to cost and other factors.

Thus, it may be advantageous to utilize much of the network infrastructure that is already deployed within a wireless network to support the second authentication method, while porting select portions of the first authentication method to the wireless network infrastructure. Such an approach may provide for deployment of the select portions of the first authentication method more rapidly than could be accomplished if all components of the first authentication method were deployed to the wireless network. Deployment of only the selected portions of the first authentication method may still improve network performance in one or more aspects. This performance improvement may be realized more quickly by utilizing the disclosed methods, systems, and computer readable medium when compared to a timeline associated with full deployment of the first authentication method.

One aspect of this disclosure provides a method for authenticating a first device. The method includes receiving, at a second device a first authentication protocol reauthentication response for the first device, the reauthentication response including a reauthentication master session key, transmitting, at the second device, a second first authentication protocol reauthentication response to a first access point based on the reauthentication master session key, generating, at the second device, a fast basic service set transition second level pairwise master key for a second access point based on the reauthentication master session key, generating, at the second device, a key message to include the fast basic service set transition second level pairwise master key for the second access point; and transmitting, at the second device, the key message to the second access point.

In some aspects, generating the fast basic service set transition second level pairwise master key for the second access point comprises generating a fast basic service set transition first level pairwise master key based on the reauthentication master session key; and generating the fast basic service set transition second level pairwise master key for the second access point based on the first level pairwise master key.

In some aspects, the method also includes generating, at the second device, a fast basic service set transition second level pairwise master key for the first access point based on the fast basic service set transition first level pairwise master key and one or more properties of the first access point; and generating, at the second device, the second first authentication protocol reauthentication response to include the pairwise master key for the first access point. In some aspects, the method includes receiving, at the second device, a key request message from the second access point; and transmitting, by the second device, the fast basic service set transition second level pairwise master key for the second access point to the second access point in response to reception of the key request message. In some aspects, the second access point transmits the key request message to the second device in response to a second authentication protocol exchange with the first device. In some aspects, the first authentication protocol is extensible authentication protocol reauthentication protocol, and the second authentication protocol is fast basic service set transition authentication.

Another aspect disclosed is an apparatus for authenticating a device. The apparatus includes a receiver configured to receive a first authentication protocol reauthentication response for the device, the reauthentication response including a reauthentication master session key, a transmitter configured to transmit a second first authentication protocol reauthentication response to a first access point based on the reauthentication master session key, and a processor configured to generate a fast basic service set transition second level pairwise master key for a second access point based on the reauthentication master session key, and generate a second authentication protocol reauthentication response message to include the fast basic service set transition second level pairwise master key for the second access point, and wherein the transmitter is further configured to transmit the second authentication protocol reauthentication response message to the second access point.

In some aspects, the processor is further configured to generate the fast basic service set transition second level pairwise master key for the second access point by generating an fast basic service set transition first level pairwise master key based on the reauthentication master session key; and generate the fast basic service set transition second level pairwise master key for the second access point based on the fast basic service set transition first level pairwise master key and one or more properties of the second access point.

In some aspects, the processor is further configured to: generate a fast basic service set transition second level pairwise master key for the first access point based on the fast basic service set transition first level pairwise master key and one or more properties of the first access point, and generate the second first authentication protocol reauthentication response to include the pairwise master key for the first access point. In some aspects of the apparatus, the receiver is further configured to receive a first authentication protocol reauthentication request for the device from the first access point, and wherein the transmitter is further configured to transmit a first authentication protocol reauthentication request for the device in response to the receiver receiving the first authentication protocol reauthentication request from the first access point. In some aspects, the first authentication protocol is extensible authentication protocol reauthentication protocol, and the second authentication protocol is fast basic service set transition authentication.

In some aspects, the receiver is further configured to receive a key request message from the second access point; and the transmitter is further configured to transmit the fast basic service set transition second level pairwise master key for the second access point to the second access point in response to reception of the key request message.

Another aspect disclosed is a method of authentication over a network by a device. The method includes receiving a network message from a first access point, determining, based on the network message, whether to authenticate with the first access point via a first authentication protocol or a second authentication protocol; and authenticating with the first access point using the determined authentication protocol. In some aspects, the network message includes a mobility domain identifier, and the determining whether to authenticate with the first access point via the first or second authentication protocol is based on the mobility domain identifier. In some aspects, the network message includes one or more indicators of authentication protocols supported by the access point, and the determining whether to authenticate with the first access point via the first or second authentication protocol is based on the one or more indicators. In some aspects, the first authentication protocol is extensible authentication protocol-reauthentication protocol and the second authentication protocol is fast basic service set transition authentication. In some aspects, the method also includes receiving a message from the first access point indicating a first mobility domain identifier for the first access point, authenticating with a second access point having a second mobility domain identifier, authenticating with the first access point using Extensible Authentication Protocol-Reauthentication Protocol in response to the first mobility domain identifier being different than the second mobility domain identifier.

In some aspects, the method includes authenticating with the first access point using fast basic service set transition authentication protocol in response to the first mobility identifier matching the second mobility domain identifier. In some aspects, the authentication with the second access point uses extensible authentication protocol reauthentication protocol, and the method further includes determining a reauthentication master session key based on the extensible authentication protocol reauthentication protocol exchange with the second access point, deriving a fast basic service set transition first level pairwise master key from the reauthentication master session key, deriving a fast basic service set transition second level pairwise master key based on the fast basic service set transition first level pairwise master key and one or more properties of the second access point; and communicating with the second access point based on the fast basic service set transition second level pairwise master key. In some aspects the method also includes deriving a second fast basic service set transition second level pairwise master key based on the fast basic service set transition first level pairwise master key and one or more properties of the first access point; and communicating with the first access point based on the second fast basic service set transition second level pairwise master key.

In some aspects, the method also includes performing a diffie-hellman key exchange with the first access point, deriving a pairwise transient key based on the diffie-hellman key exchange and the second fast basic service set transition second level pairwise master key; and communicating with the first access point based on the derived pairwise transient key.

Another aspect disclosed is an apparatus for authentication over a network by a device. The apparatus includes a receiver configured to receive a network message from a first access point, a processor, configured to: determine, based on the network message, whether to authenticate with the first access point via a first authentication protocol or a second authentication protocol; and authenticate with the first access point using the determined authentication protocol. In some aspects, the network message includes a mobility domain identifier, and the processor is further configured to determine whether to authenticate with the first access point via the first or second authentication protocol based on the mobility domain identifier. In some aspects, the network message includes one or more indicators of authentication protocols supported by the access point, and the processor is further configured to determine whether to authenticate with the first access point via the first or second authentication protocol based on the one or more indicators. In some aspects, the first authentication protocol is extensible authentication protocol-reauthentication protocol and the second authentication protocol is fast basic service set transition authentication. In some aspects, the processor is further configured to: receive a message from the first access point indicating a first mobility domain identifier for the first access point, authenticate with a second access point having a second mobility domain identifier, authenticating with the first access point using extensible authentication protocol-reauthentication protocol in response to the first mobility domain identifier being different than the second mobility domain identifier.

In some aspects, the processor is further configured to authenticate with the first access point using fast basic service set transition authentication protocol in response to the first mobility domain identifier matching the second mobility domain identifier. In some aspects, the authentication with the second access point uses extensible authentication protocol reauthentication protocol, and the processor is further configured to: determine a reauthentication master session key based on the extensible authentication protocol reauthentication protocol exchange with the second access point, derive a fast basic service set transition first level pairwise master key from the reauthentication master session key, derive a fast basic service set transition second level pairwise master key based on the fast basic service set transition first level pairwise master key and one or more properties of the second access point, and communicate with the second access point based on the fast basic service set transition second level pairwise master key.

In some aspects, the processor is further configured to: derive a second fast basic service set transition second level pairwise master key based on the fast basic service set transition first level pairwise master key and one or more properties of the first access point, and communicate with the first access point based on the second fast basic service set transition second level pairwise master key. In some aspects, the processor is further configured to: perform a diffie-hellman key exchange with the first access point, derive a pairwise transient key based on the diffie-hellman key exchange and the second fast basic service set transition second level pairwise master key, and communicate with the first access point based on the derived pairwise transient key.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
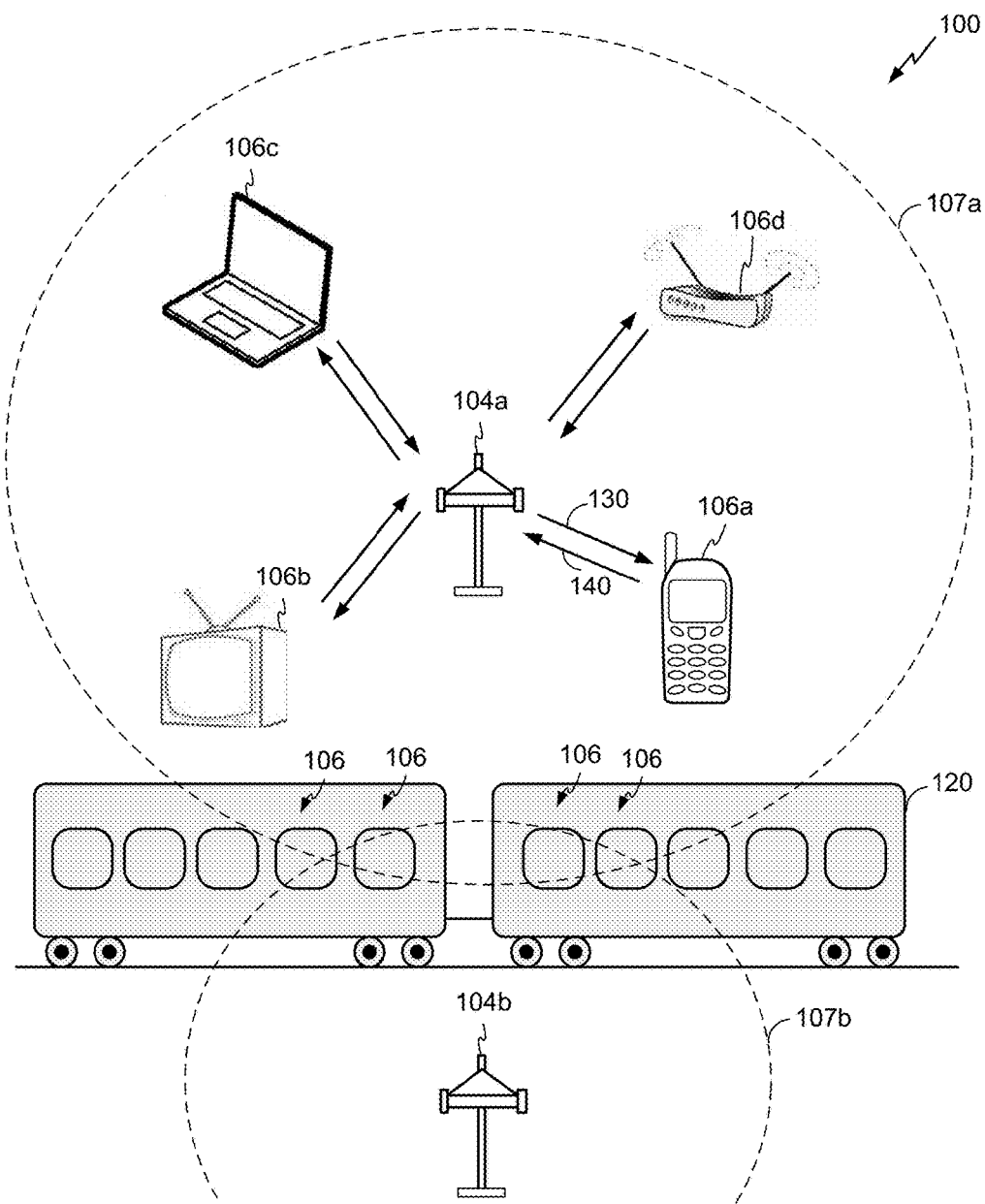
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104a, which communicates with a plurality of stations (STAs) 106a-106d in a basic service set (BSS) 107a. The wireless communication system 100 can further include a second AP 104b which can communicate in a BSS 107b. One or more STAs 106 can move in and/or out of the BSSs 107a-107b, for example, via a train 120. In various embodiments described herein, the STAs 106 and 106a-106d can be configured to quickly establish wireless links with the AP 104a and/or 104b, particularly when moving into the BSSs 107a and/or 107b. Establishing wireless communication between a station and an access point may include one or more of authentication and association.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols.

For example, the various aspects described herein can be used as part of the IEEE 802.11a, 802.11b, 802.11g, 802.11n, 802.11ah, and/or 802.11ai protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access (e.g., for use with hotspots), machine-to-machine (M2M) communications, etc.

The APs 104a-104b can serve as a hub or base station for the wireless communication system 100. For example, the AP 104a can provide wireless communication coverage in the BSS 107a, and the AP 104b can provide wireless communication coverage in the BSS 107b. The AP 104a and/or 104b can include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

The STAs 106 and 106a-106d (collectively referred to herein as STAs 106) can include a variety of devices such as, for example, laptop computers, personal digital assistants (PDAs), mobile phones, etc. The STAs 106 can connect to, or associate with, the APs 104a-104b via a WiFi (e.g., IEEE 802.11 protocol such as 802.11ai) compliant wireless link to obtain general connectivity to the Internet or to other wide area networks. The STAs 106 may also be referred to as "clients."

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104a, along with the STAs 106a-106d associated with the AP 104a, and that are configured to use the AP 104a for communication, can be referred to as a basic service set (BSS). In some embodiments, the wireless communication system 100 may not have a central AP 104a. For example, in some embodiments, the wireless communication system 100 can function as a peer-to-peer network between the STAs 106. Accordingly, the functions of the AP 104a described herein can alternatively be performed by one or more of the STAs 106. Moreover the AP 104a can implement one or more aspects described with respect to the STAs 106, in some embodiments.

A communication link that facilitates transmission from the AP 104a to one or more of the STAs 106 can be referred to as a downlink (DL) 130, and a communication link that facilitates transmission from one or more of the STAs 106 to the AP 104a can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104a and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104a and the STAs 106 in accordance with OFDM/OFDMA processes. Accordingly, the wireless communication system 100 can be referred to as an OFDM/OFDMA system. As another example, signals can be sent and received between the AP 104a and the STAs 106 in accordance with CDMA processes. Accordingly, the wireless communication system 100 can be referred to as a CDMA system.

Aspects of certain devices (such as the AP 104a and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

Association and Authentication

Generally, in IEEE 802.1X protocols, authentication takes place between a STA and an authentication server (e.g., a server that provides authentication services, such as identity verification, authorization, privacy, and non-repudiation). For example, the AP, which functions as an authenticator, relays messages between the AP and the authentication server during the authentication process. In some instances, the authentication messages between the STA and the AP are transported using extensible authentication protocol over local area network (EAPOL) frames. EAPOL frames may be defined in the IEEE 802.11i protocol. The authentication messages between the AP and the authentication server may be transported using the remote authentication dial in user service (RADIUS) protocol or the Diameter authentication, authorization, and accounting protocol.

During the authentication process, the authentication server may take a long time to respond to messages received from the AP. For example, the authentication server may be physically located at a location remote from the AP, so the delay may be attributed to the backhaul link speed. As another example, the authentication server may be processing a large number of authentication requests initiated by STAs and/or APs (e.g., there may be a large number of STAs in a dense area, such as on the train 120, each of which are attempting to establish a connection). Thus, the delay may be attributed to the loading (e.g., traffic) on the authentication server.

Because of the delay attributed to the authentication server, the STAs may be idle for long periods of time.

Figure 2:
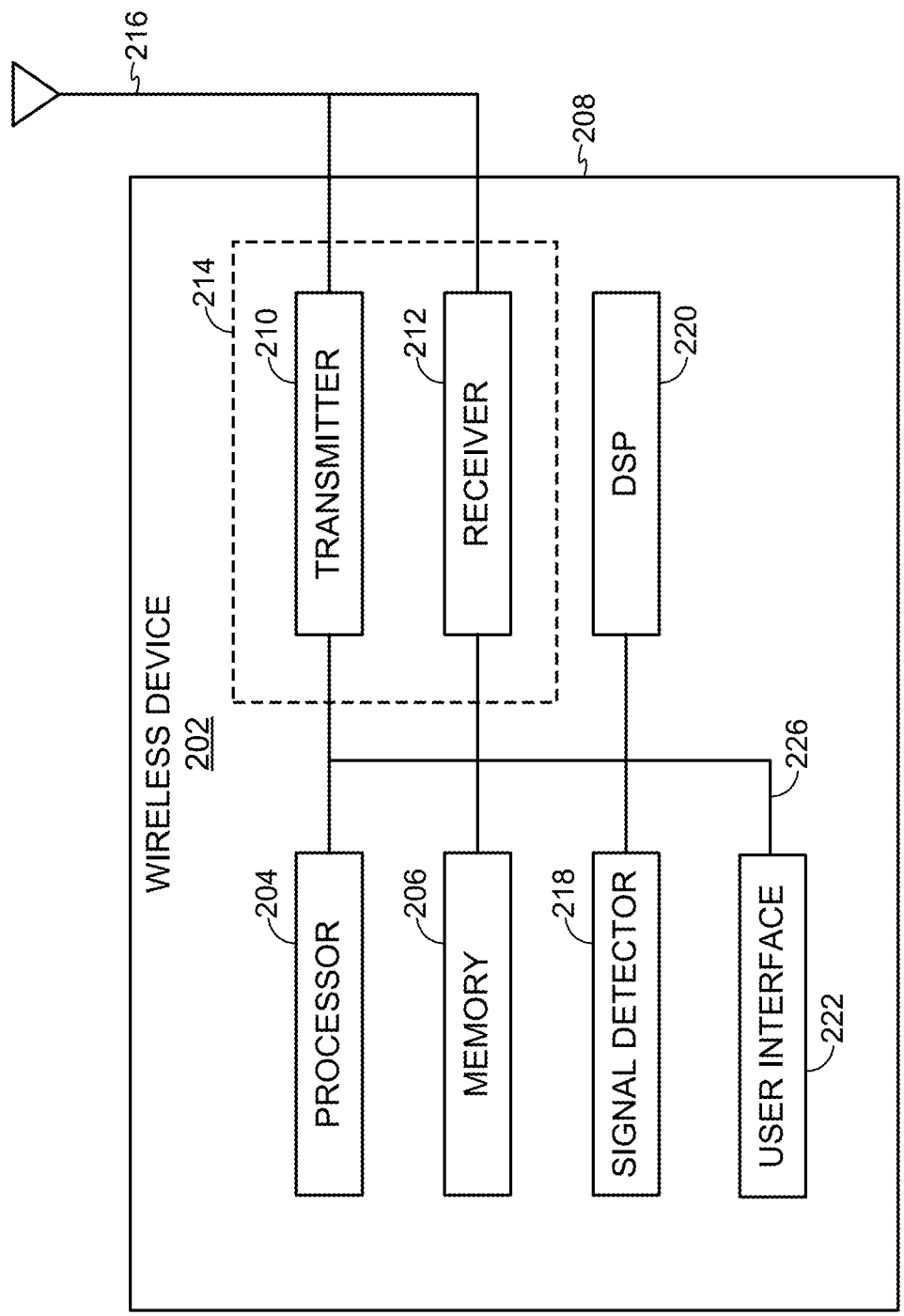
FIG. 2 illustrates a illustrative embodiment of a wireless device of one or more of the wireless devices of FIG. 1.

FIG. 2 shows an exemplary functional block diagram of a wireless device 202 that may be employed within the wireless network 100 of FIG. 1. The wireless device 202 is an example of a device that may be configured to implement the various methods described herein. For example, the wireless device 202 may comprise one of the devices 104 or 106 in FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise any of wireless devices shown in FIG. 1 and may be used to transmit and/or receive communications. That is, any of wireless devices 104 or 106 may serve as transmitter or receiver devices. Certain aspects contemplate signal detector 218 being used by software running on memory 206 and processor 204 to detect the presence of a transmitter or receiver.

As described above, a wireless device, such as wireless device 202, may be configured to provide services within a wireless communication system, such as the wireless communication system 100.

Figure 3:
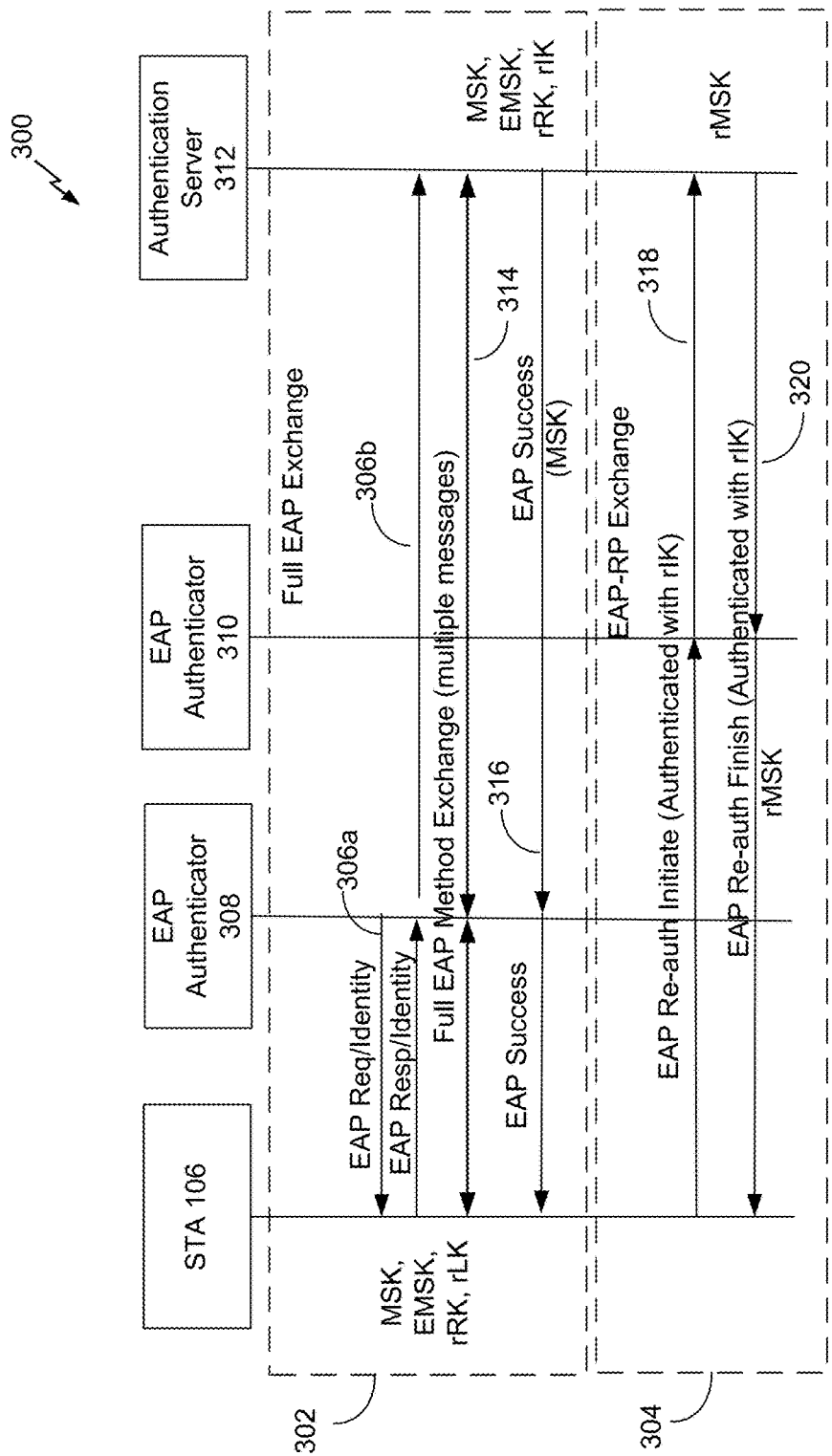
FIG. 3 illustrates message flows during an extended authentication protocol (EAP) authentication and an extended authentication protocol reauthentication protocol (EAP-RP) authentication.

FIG. 3 shows message flows of an extensible authentication protocol (EAP) full authentication process (EAP) 302, for example, as defined in IETF RFC 2284, the contents of which are hereby incorporated by reference in its entirety, and reauthentication process (EAP-RP) 304, for example, as defined in IETF RFC 6696, the contents of which are hereby incorporated by reference in its entirety. In some aspects, the full EAP authentication 302 includes the station 106 receiving an EAP Request/Identity message 306a from an EAP authenticator. In some aspects, the EAP authenticator 308 may be an access point or a wireless lan controller. In response to this trigger from the authenticator, the STA 106 may initiate an ERP exchange by transmitting an EAP-Initiate/Re-authentication message, which may be included in message flows 314.

In the illustrated embodiment, the authentication server 312 may include an ER server (not shown), which is a different logical entity than the AS server. During EAP full authentication, the authentication server 312 may generate one or more of a master session key (MSK), an extended master session key (EMSK), a re-authentication root key (rRK) and a re-authentication integrity key (rIK). For example, the rRK and rIK may be transmitted to an ER server, which in the illustrated embodiment is collocated with the authentication server 312

When the full EAP authentication has been completed, the authentication server 312 may send an EAP success status to the STA 106 via message 316. The master session key (MSK) may also be provided to the STA 106 in message 316.

The station 106 may then perform an EAP reauthentication process (EAP-RP) 304 with a second authenticator 310. In some aspects the second authenticator 310 may be a second access point. In some aspects the second authenticator 310 may be a wireless lan controller. The station 106 may send an extensible authentication protocol re-authentication request 318 to the authentication server 312 via the EAP authenticator 310. In some aspects, the extensible authentication protocol reauthentication request 318 may be soft "relayed" from one device to another, so as to form a second extensible authentication protocol reauthentication request 318. In some aspects, there may be some differences between the two messages, but each of these two messages will function as an EAP Re-auth initiate message. The authentication server 312 may generate a reauthentication master session key (rMSK) and transmit an EAP re-authentication finish message 320 to the STA 106 via the EAP authenticator 310 in some aspects. The rMSK may be provided to the EAP Authenticator 310 via message 320. In some aspects, the message 320 may be considered an extensible authentication protocol reauthentication response message. Note that message 320 may be "relayed" from the EAP authentication server 312 to the EAP authenticator 310, to the EAP Authenticator 308. Thus, the message 320 may be considered a first extensible authentication protocol reauthentication response message between two devices, such as authentication server 312 and EAP authenticator 310, and a second extensible authentication protocol reauthentication response message between two other devices, such as the EAP authenticator 310 and the EAP Authenticator 308.

The STA 106 may separately derive the rMSK.

Figure 4:
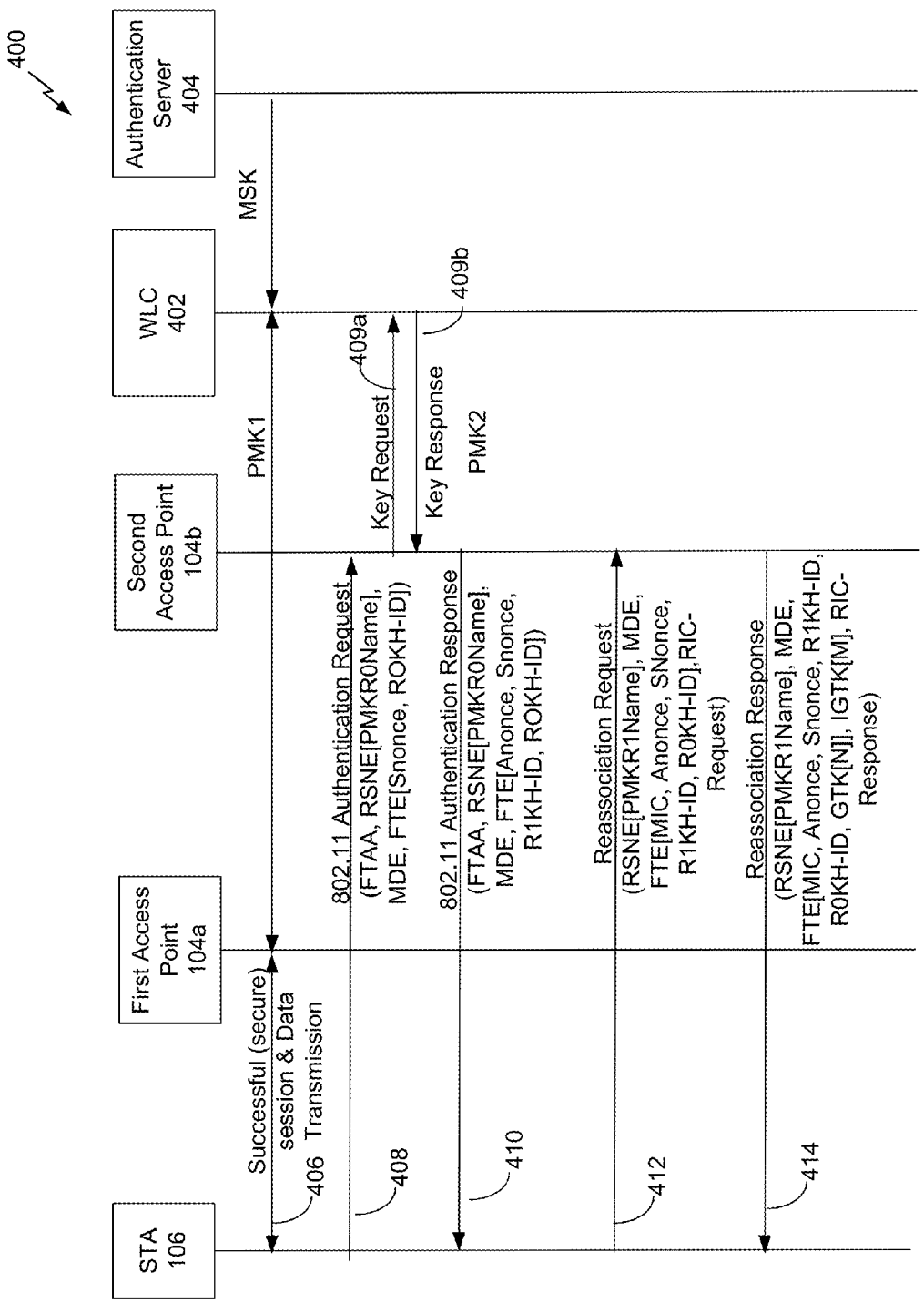
FIG. 4 illustrates message flows during a fast basic service set (BSS) transition (FT) authentication.

FIG. 4 shows a fast basic service set (BSS) transition (FT) authentication and reauthentication process 400. STA 106 may first perform success and session establishment and data transmission with a first access point 104a via message flows 406. Message flows 406 may include the wireless lan controller 402 and/or authentication sever 404 in some aspects (not shown), but may not include the second access point 104b. The wireless lan controller 402 may also be referred to as a mobility domain controller in some aspects.

During fast basic service set authentication of the STA 106 with the first access point 104a, the authentication server 404 may provide a master session key (MSK) to the wireless lan controller 402. From the master session key, the wireless lan controller may derive a fast basic service set transition first level pairwise master key. From the first level PMK, one or more fast basic service set transition second level pairwise master keys may be derived, as shown in FIG. 4 as PMK1. The PMK 1 may then be provided to the first access point 104a. The first access point 104a may utilize the PMK1 provided by the WLC 402 to make a secure association with the STA 106. For example, communications between the first access point 104a and the STA 106 may be encrypted using the key (i.e., PTK) derived from PMK1 provided by the WLC 402.

The STA 106 may then move within range of a second access point 104b. The STA 106 may then transmit an 802.11 authentication request 408 to the second access point 104b. In response, the AP 104b may transmit a key request message 409a to the wireless lan controller 402. The wireless lan controller 402 provides a second fast basic service set transition second level pairwise master key to the second access point (PMK2) via key response message 409b. In some aspects, message 409b may not be preceded by an explicit key request message 409a, and may be known as a key message. The key response message 409b, even when preceded by the key request message 409a may also be known as a key message. The second access point 104b may utilize the second fast basic service set transition second level pairwise master key (PMK2) to derive PTK2 and encrypt communication between the STA 106 and the second access point 104b using PTK2. The AP 104b then transmits an 802.11 authentication response message 410 to the STA 106. The STA 106 may also perform a reassociation with the second access point 104b via reassociation request/reply messages 412/414.

Figure 5:
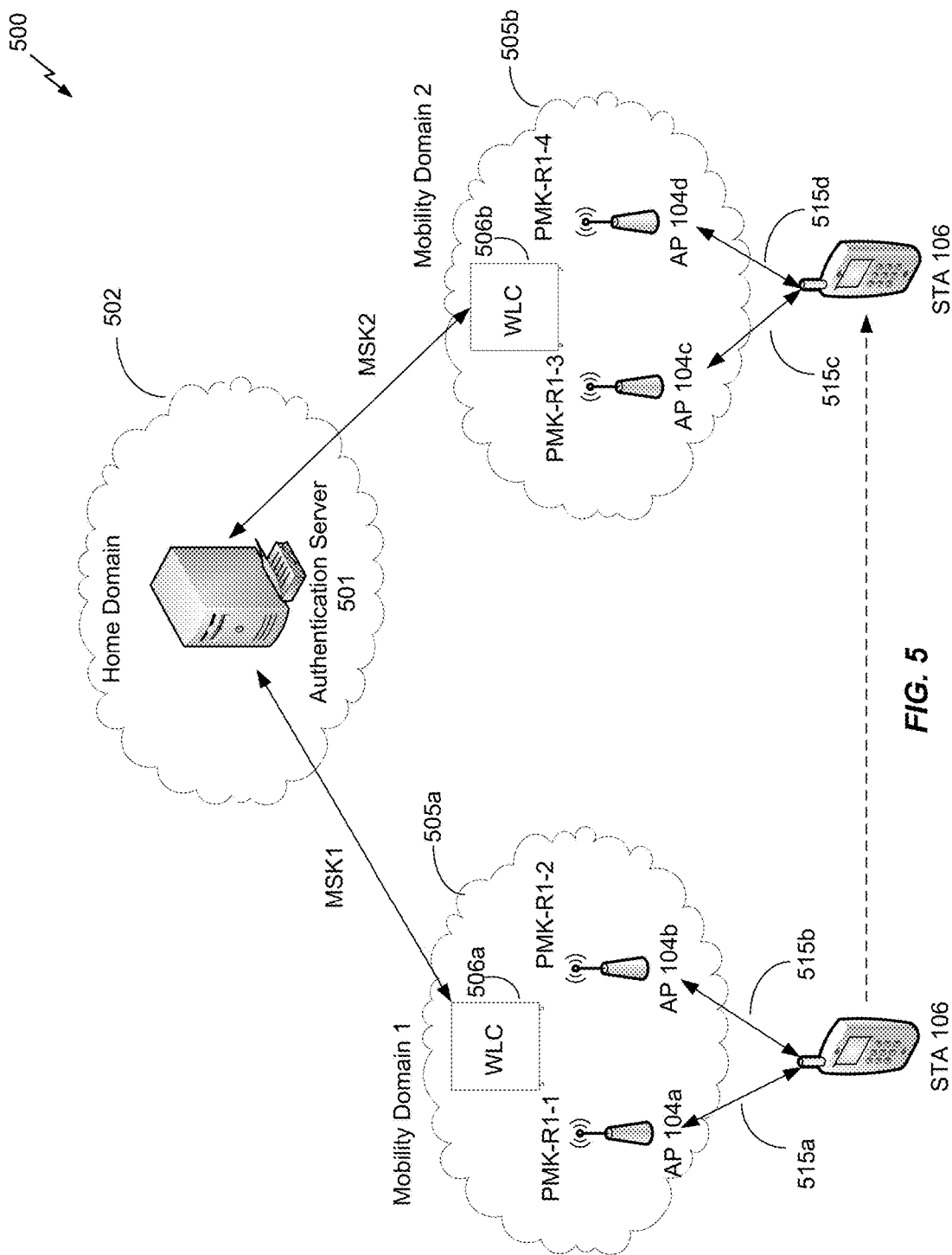
FIG. 5 illustrates message flows between wireless network components during one embodiment of an authentication process.

FIG. 5 is an illustration of message flows between network device components in one embodiment of an authentication method. FIG. 5 shows a home domain 502, including an authentication server 501, along with two mobility domains 505a and 505b. Within each mobility domain 505a-b are two access points, APs 104a-b, and APs 104c-d respectively. Each mobility domain 505a-b also includes a wireless lan controller (WLC) 506a-b. The wireless lan controllers 506a-b may also be referred to as mobility domain controllers. The WLC's 506a-b may also be known as "R0 Key holders." A STA 106 shown at the bottom of FIG. 5 may move from the left to the right of the figure. As STA 106 moves, it may authenticate with AP 104a, then AP 104b, then AP 104c, and then AP 104d.

Authentication message exchange 515a may perform a full EAP authentication, as shown in FIG. 3. With full EAP authentication, an authentication initiated by the STA 106 will cause messages to be exchanged with the authentication server 501. For example, the authentication server 501 may create a master session key (MSK1), and provide the MSK1 to the WLC 506a. The WLC 506a may then derive a pairwise master key (PMK) based on the MSK1 and provide the PMK to the AP 104a (this key is shown as PMK-R1-1 in FIG. 5). The PMK provided to the AP 104a may also be derived based on a characteristic of the AP 104a, such as the AP 104a's media access control (MAC) address in some aspects.

The STA 106 may then authenticate with the AP 104b, via authentication message exchange 515b. Since the AP 104b is within the same mobility domain as the AP 104a, the STA 106 may determine (via beacon messages from the AP 104b) that it does not need to perform a full EAP authentication with the AP 104b, but can instead perform an authentication based on the master session key (MSK1) stored at the WLC 506a. The authentication may be based on the MSK1 in that it based on a PMK-R0 derived from the MSK1.

In some aspects, the STA 106 performs a fast basic service set transition authentication as part of authentication message exchange 515b, an example of which is shown above with reference to FIG. 4. This authentication may not require the WLC 506a to exchange messages with the authentication server 501 when the STA 106 authenticates with the AP 104b. Instead, the WLC 506a derives a second PMK, shown as PMK-R1-2 in FIG. 5 based on the first master session key (MSK1) provided by the authentication server 501 when the STA 106 authenticated with AP 104a. The second PMK PMK-R1-2 may also be derived based on one or more characteristics of the AP 104b, such as the AP 104b's MAC address in some aspects. Since no messages may need to be exchanged with the authentication server 501 when the STA 106 authenticates with the AP 104b, the authentication message exchange 515b may occur more quickly than the authentication message exchange 515a. Additionally, load on the authentication server 501 may be reduced, relative to a solution that required the STA 106 to authentication with the authentication server 501 every time it authenticated with a new access point.

The STA 106 may then move to a location such that the AP 104b is out of range, and the STA 106 may authenticate with the AP 104c via message exchange 515c. In IEEE 802.11r, the STA 106 would then perform another full EAP authentication as part of message exchange 515c, since the AP 104c is in a different mobility domain (505b) than the AP 104a (which is in mobility domain 505a). During the full EAP authentication, the authentication server 501 generates a new master session key (MSK2) and transmits the MSK2 to the wireless lan controller (WLC) 506b. The WLC 506b then generates a PMK based on the MSK2 and also, in some aspects, based on one or more characteristics of the AP 104c. When the STA 106 moves again and connects with AP 104d, since AP 104d is in the same mobility domain as AP 104c, the STA 106 may perform an authentication via message exchange 515d. In some aspects, message exchange 515d performs a fast basic service set transition authentication, an example of which is shown above with reference to FIG. 4. During this authentication, the WLC 506b may generate a new PMK (PMK-R1-4) based on the previously derived MSK2 received from the authentication server 501. Since the MSK2 may be stored at the WLC 506b, this authentication can occur without necessarily communicating with the authentication server 501.

Figure 6:
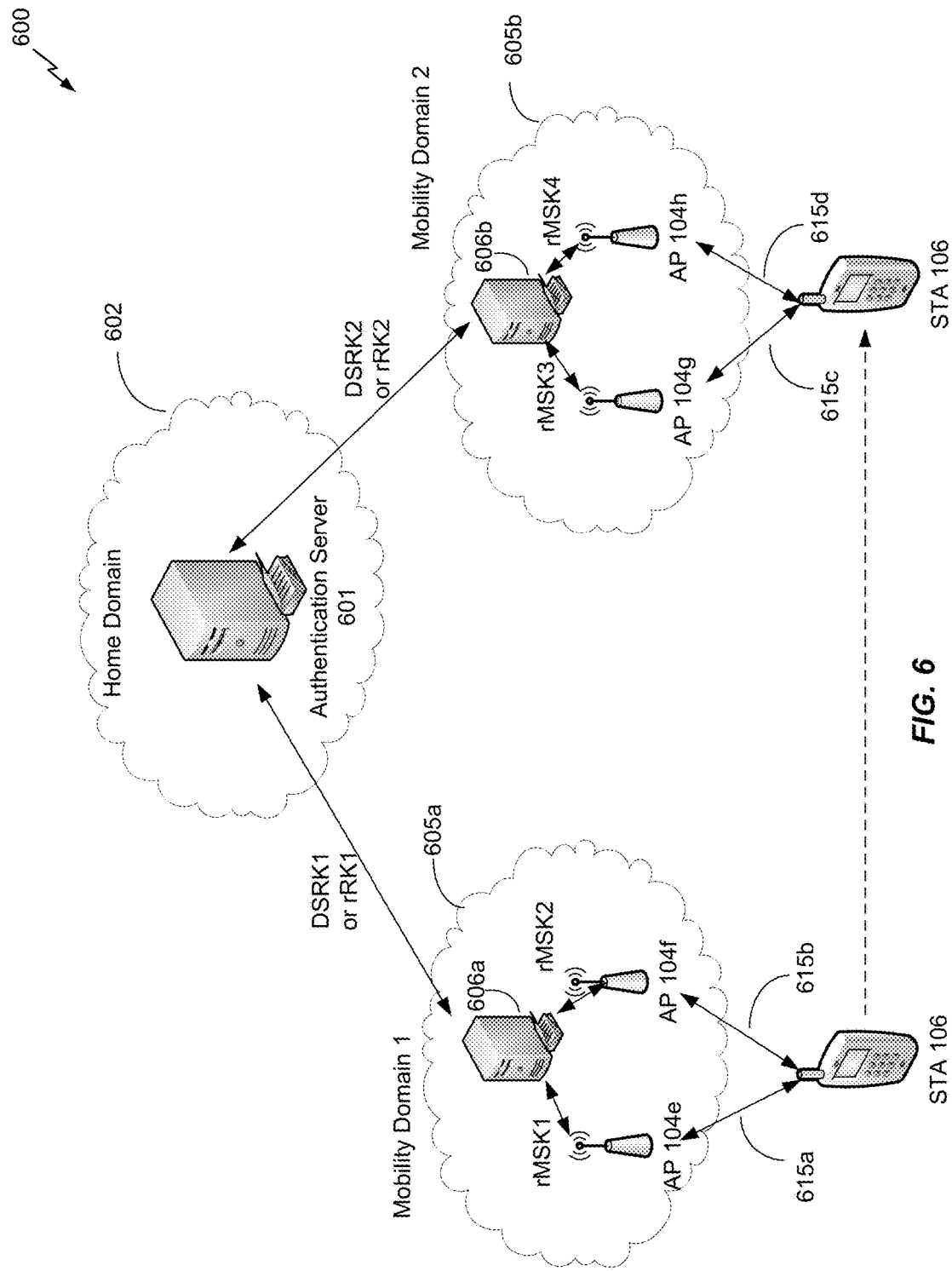
FIG. 6 illustrates message flows between wireless network components in another embodiment of an authentication process.

FIG. 6 illustrates message flows between wireless network components during another embodiment of an authentication process. FIG. 6 shows a home domain 602, and two mobility domains 605a-b. The home domain 602 includes an authentication server 601. Each of the mobility domains 605a-b includes an EAP Re-authentication server or local ER server 606a-b. The devices 606s-b may also be referred to as mobility domain controllers. Each of the mobility domains 605a-b each include two access points, APs 104e-f and APs 104g-h respectively.

Similar to FIG. 5, in FIG. 6, the STA 106 first authenticates with the AP 104e via message exchange 615a. This first authentication performs an extended authentication protocol reauthentication protocol (EAP-RP) authentication with the authentication server 601 as part of message exchange 615a. For the example, the STa 106 may transmit an EAP initiate/Re-Auth message to the AP 104e. The AP 104e may perform relay services during the exchange between the STA 106 and authentication server 601. When the authentication server 601 receives the EAP Initiate/Re-Auth message, the authentication server 601 (which is performed immediately after an initial full EAP authentication), the authentication server 601 creates a reauthentication root key (rRK1) or a domain specific root key (DSRK1) and provides the rRK1 or DSRK1 to the local ER server 606a. The local ER server 606a may then derive a reauthentication master session key (rMSK1) from the DSRK1 or rRK1 and provide the rMSK1 to the AP 104e. This information may be provided to the STA 106 via an EAP-Finish Re-Auth message, as described in RFC 6696 in some aspects.

The AP 104e then performs communication with the STA 106 using the rMSK1. STA 106 may then move out of range of the AP 104e and authenticate with the AP 104f via the message exchange 615b. Since the local ER server 606a stored the rRK1 from the STA 106 first authentication with the AP 104e, the second (EAP-RP) authentication that occurs via message exchange 615b may not require communication with the authentication server 601. Instead, the local ER server 606a may derive a second reauthentication master session key (rMSK2) from the domain specific root key (DSRK1) or reauthentication root key rRK1 and provide the rMSK2 to the AP 104f. The AP 104f may then communicate with the STA 106 based on the rMSK2.

The STA 106 may then move such that it is no longer in range of AP 104f. The STA 106 may then authenticate with the AP 104g with EAP-RP. Since the local ER server 606b does not have a key associated with the STA 106, the local ER server 606b communicates with the authentication server 601 to obtain a re-authentication root key rRK2 or domain specific root key DSRK2 for the station 106. The local ER server 606b then derives a reauthentication master session key for the STA 106 (rMSK3) and provides the key to AP 104g, which uses the rMSK3 key in communication with the STA 106.

The STA 106 then authenticates with the AP 104h. Since the local ER server 606b has a key associated with the STA 106 (i.e. rRK2), the local ER server 606b derives a new reauthentication master session key (rMSK4) based on the key received from the authentication server 601 (either the DSRK2 or rRK2) for use between the STA 106 and the AP 104h. AP 104h then uses the rMSK4 to communicate with the STA 106.

Figure 7:
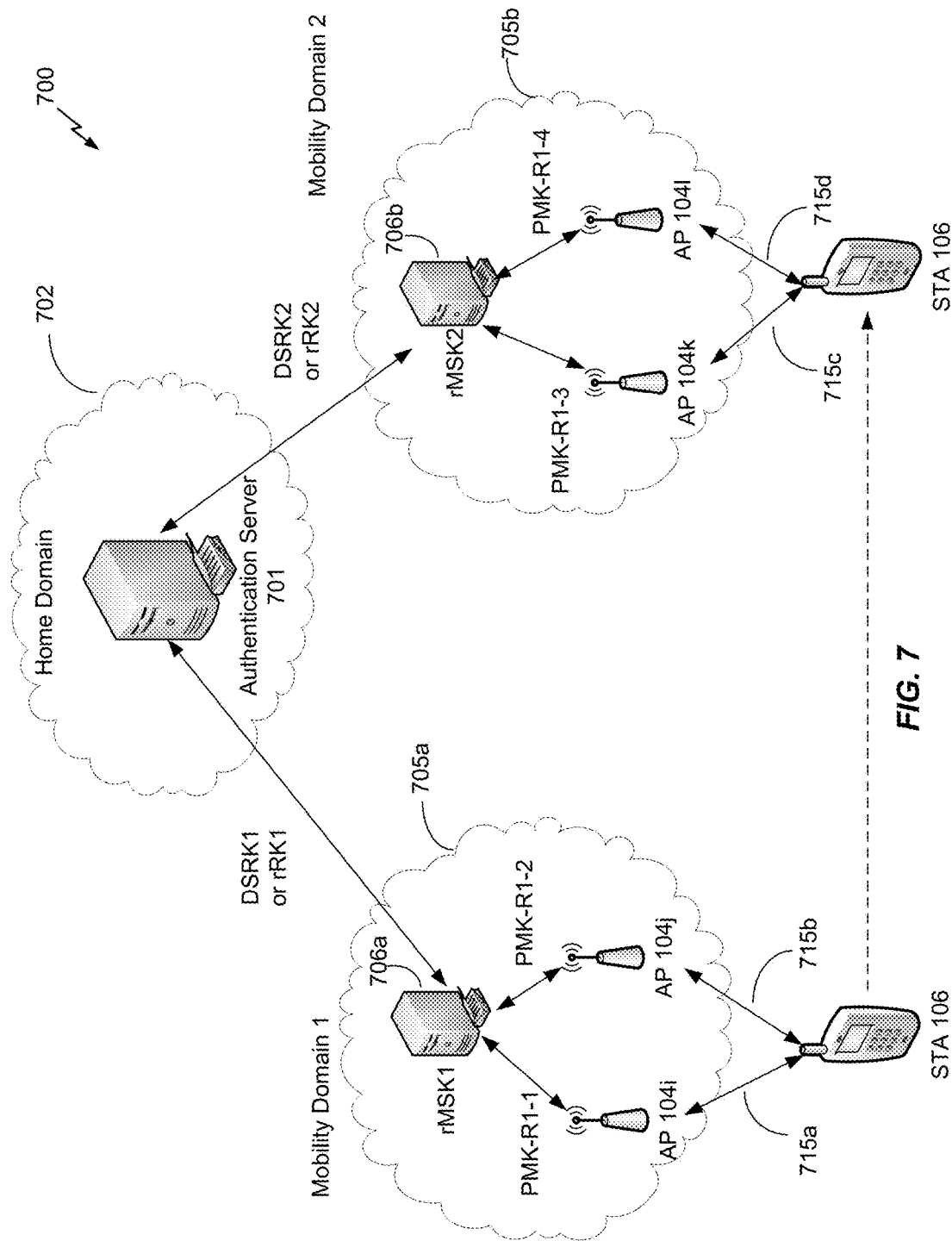
FIG. 7 illustrates message flows between wireless network components in another embodiment of an authentication process.

FIG. 7 illustrates message flows between wireless network components in another embodiment of an authentication process. The communications system 700 includes a home domain 702, and two mobility domains 705a-b. Within the home domain is an authentication server 701. Within each of the mobility domains 705a-b is a local ER server 706a-b respectively. The devices 706a-b may also be referred to as mobility domain controllers. In some aspects, either of the local ER servers 706a-b may be the device 202 of FIG. 2. Each mobility domain 705a-b also includes two access points AP 104i-j and AP 104k-1 respectively. In FIG. 7, the local ER servers 706a-b may also perform functions associated with R0 key holder devices as described in the IEEE 802.11r specification.

Similar to the authentication method described with respect to FIG. 6, the authentication server 701 provides either reauthentication root keys rRK1 and rRK2, or domain specific root keys DSRK1 and DSRK2, to the local ER server's 706a and 706b respectively. The keys may be provided in response to the STA 106 authenticating via access points connected to each of the local ER server's 706a (APs 104i-j) and 706b (AP 104k-l).

FIG. 7 shows a first authentication message exchange 715a between the mobile station STA 106 and AP 104i. In some aspects, this authentication message exchange may utilize a first authentication protocol, such as an EAP reauthentication (EAP-RP) authentication protocol. In some aspects, the local ER servers 706a-b may generate a reauthentication master session key (rMSK) based on the keys provided by the authentication server 701, such as rRK1/RK2 or DSRK1/DSRK2 as shown in FIG. 7. The reauthentication master session key may then be used to generate PMK's provided to the access points AP 104i-l. For example, the local ER server 706a may derive a first reauthentication master session key (rMSK1) from the reauthentication root key rRK1 received from the authentication server 701 when STA 106 authenticates via AP 104i via authentication message exchange 715a. In some aspects, the local ER server 706a may generate a first PMK based on the reauthentication master session key rMSK1. In some aspects, this first PMK is an IEEE 802.11 Fast BSS Transition (FT) first level PMK, such as a PMK-R0. The local ER server 706a may then generate a second PMK, such as a PMK-R1-1 as shown in FIG. 7 based on the rMSK1. In some aspects, generation of the PMK-R1 may be additionally based on one or more characteristics of the AP 104i, such as its media access control address, and/or characteristics of the STA 106, such as its MAC address. The local ER server 706a may also generate, in response to an authentication message exchange 715b from the STA 106 via AP 104j, a second PMK, shown as PMK-R1-2 in FIG. 7, based also on the rMSK1. The authentication message exchange 715b may include a second authentication protocol reauthentication request from the STA 106 to the AP 104j.

In some aspects, authentication message exchange 715a is an EAP-RP exchange and authentication message exchange 715b is a fast BSS transition (FT) authentication. When the AP 104j receives the second authentication protocol reauthentication request from the STA 106, it may request a key from the local ER server 706a. In response to receiving the key request, the local ER server 706a may generate the second PMK RMK-R1-2. Alternatively, the local ER server 706a may proactively generate a PMK for the AP 104j during or in response to the EAP-RP reauthentication. In some embodiments, the PMK-R1 for the AP 104j may be transmitted proactively to the AP 104j, such that when authentication message exchange 715b occurs with the STA 106, the AP 104j already has a PMK-R1 available for use with the STA 106.

Message exchange 715c may be an EAP-RP reauthentication between the STA 106 and the AP 104k. The EAP-RP reauthentication may be passed through the AP 104k such that the STA 106 and local ER server 706b exchange EAP-RP protocol messages. Authentication message exchange 715d may utilize a second authentication protocol, for example, fast BSS transition (FT) authentication. In some aspects, the AP 104l may transmit a message to the local ER server 706b requesting a key for use in communication with STA 106 upon receiving an authentication request message as part of the second authentication protocol.

Figure 8:
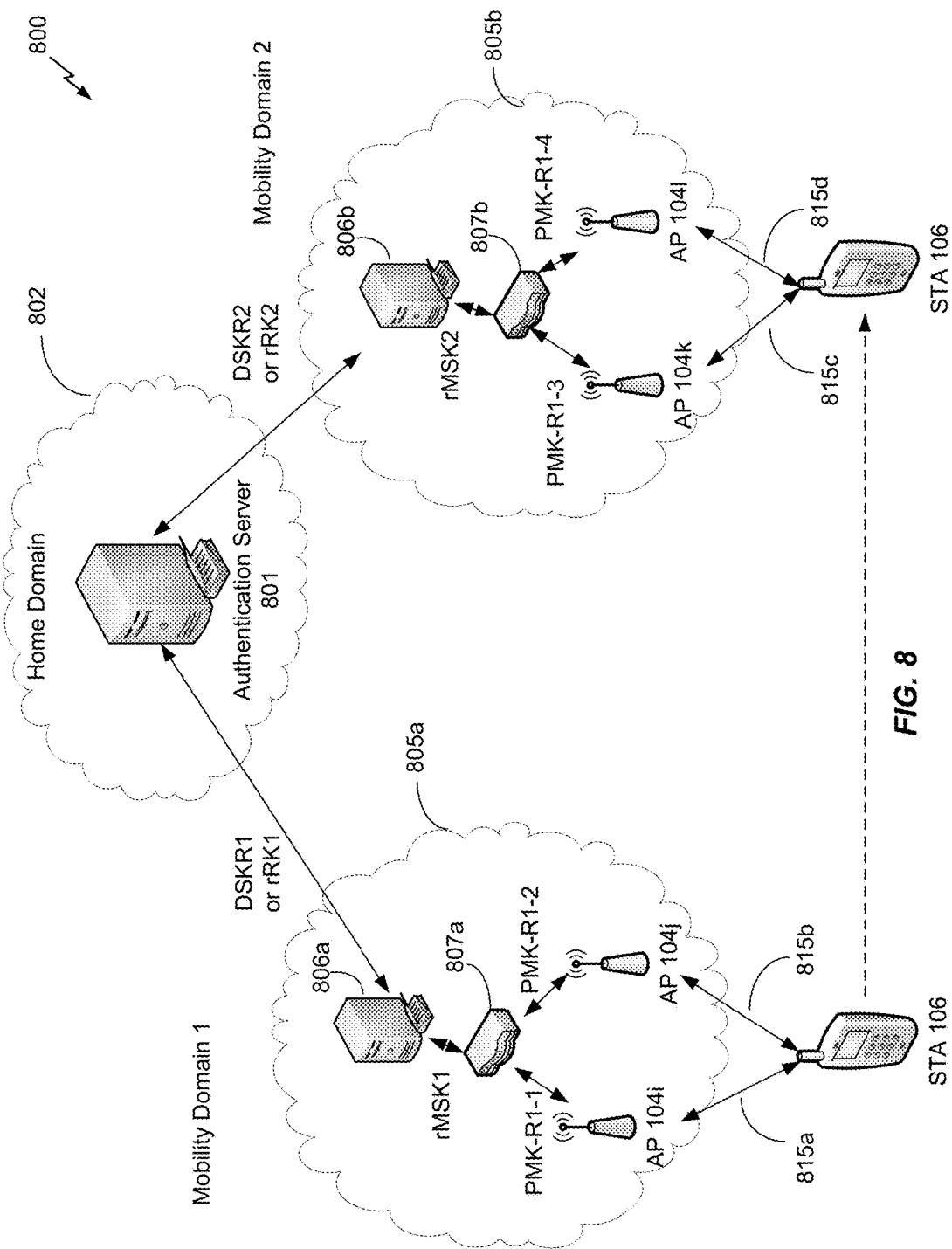
FIG. 8 illustrates message flows between wireless network components in another embodiment of an authentication process.

As shown in FIG. 8, in some other aspects, some functions of the local ER server 706a-b described above may be performed by multiple devices, such as local ER servers 806a-b and 807a-b. In some of these aspects, the devices 807a-b may be the wireless device 202, shown above in FIG. 2.

In some mobility domains, such as those shown in FIG. 8, a local ER server 806a-b and a separate key holder device 807a-b may be used to perform authentication of wireless devices such as wireless device STA 106. The devices 807a-b may also be referred to as mobility domain controllers. For example, in some aspects, the local ER server may derive a reauthentication master session key (such as rMSK1 and/or rMSK2 discussed above, and provide these keys to a "R0 key holder" device 807a-b. The R0 key holder devices 807a-b may then generate a PMK for an access point based on the reauthentication master session key. For example, FIG. 8 shows the key holder device 807a providing a PMK-R1-1 to the AP 104i. The key holder device 807a may have derived the PMK-R1-1 based on the rMSK1 provided by the local ER server 806a. In some aspects, an intermediate PMK, such as a PMK-R0, may first be derived from the reauthentication master session key (rMSK1 or rMSK2), and then a PMK-R1 is derived from the PMK-R0.

Returning to the description of FIG. 7, the first authentication via authentication message exchange 715a (FIG. 4) by STA 106 occurs with AP 104i. This authentication may be performed using the authentication server 701 respectively and may utilize in some aspects an extended authentication protocol reauthentication protocol (EAP-RP). The second authentication performed via authentication message exchange 715b may be performed without necessarily contacting the authentication server 701. For example, since the local ER server 706a (or key holder device of FIG. 8) may have stored the reauthentication master session key rMSK1, the PMK-R1-2 may be generated for the AP 104j without communicating with the authentication server 701.

When the STA 106 authenticates with AP 104k via message exchange 715c, an EAP reauthentication (EAP-RP) may be performed with the authentication server 701. The STA 106 may determine to perform an EAP-RP at least in part based on determining that the AP 104k is in a different mobility domain than the AP 104j. This information may be provided via beacon signals transmitted by AP 104j and AP 104k. The STA 106 may also determine that its home authentication server 701 is accessible via the AP 104k via beacon signals transmitted by the AP 104k. The EAP reauthentication that occurs via message exchange 715c may cause the home authentication server 701 to provide a reauthentication root key rRK2 to the local ER server 706b. The local ER server 706b derives a reauthentication master session key rMSK2 from the reauthentication root key rRK2. A PMK-R1-3 is then derived based on the rMSK2 (in some aspects, via an intermediate pairwise master key such as a PMK-R0). The PMK-R1-3 is then used for communication between the AP 104k and the STA 106.

When the STA 106 authenticates with the AP 104l via authentication message exchange 715d, the local ER server 706b (or key holder device 807b in FIG. 8) may receive a key request message from the AP 104l, requesting a key for use in communication between the STA 106 and the AP 104l. Since the local ER server 706b has stored the rMSK2, it may derive a PMK-R1-4 for use in communication between the AP 104l and the STA 106 and transmit a key response message to the AP 104l including the PMK-R1-4.

In FIG. 8, the message exchange 815a may perform extensible authentication protocol reauthentication protocol (EAP-RP) authentication, as discussed above with respect to FIG. 3. Message exchange 815b may, in some aspects, perform fast basic service set transition (FT) authentication, as discussed above with respect to FIG. 4. Similarly, message exchange 815c may perform EAP-RP authentication while message exchange 815d performs FT authentication.

Similar to the messaging discussed with respect to FIG. 7, in response to the AP 104j and/or the AP 104l performing fast basic service set transition authentication with the STA 106, the AP's 104j and/or AP 104l may transmit key request messages to the R0 key holder devices 807a and/or 807b respectively. The APs 104j and/or AP 104l may generate the PMK-R1-2 and/or PMK-R1-4 in response to the key request messages and transmit the PMKs to the APs via a key response message. Alternatively, the R0 key holder devices 807a-b may proactively transmit PMK-R1's to the AP's when the reauthentication master session key is received from the local ER servers 806a-b respectively.

With the authentication method 800 shown in FIG. 8, a single local ER server, such as the local ER servers 806a-b may support multiple mobility domains (i.e., multiple key holder devices such as key holder devices 807a-b).

Figure 9:
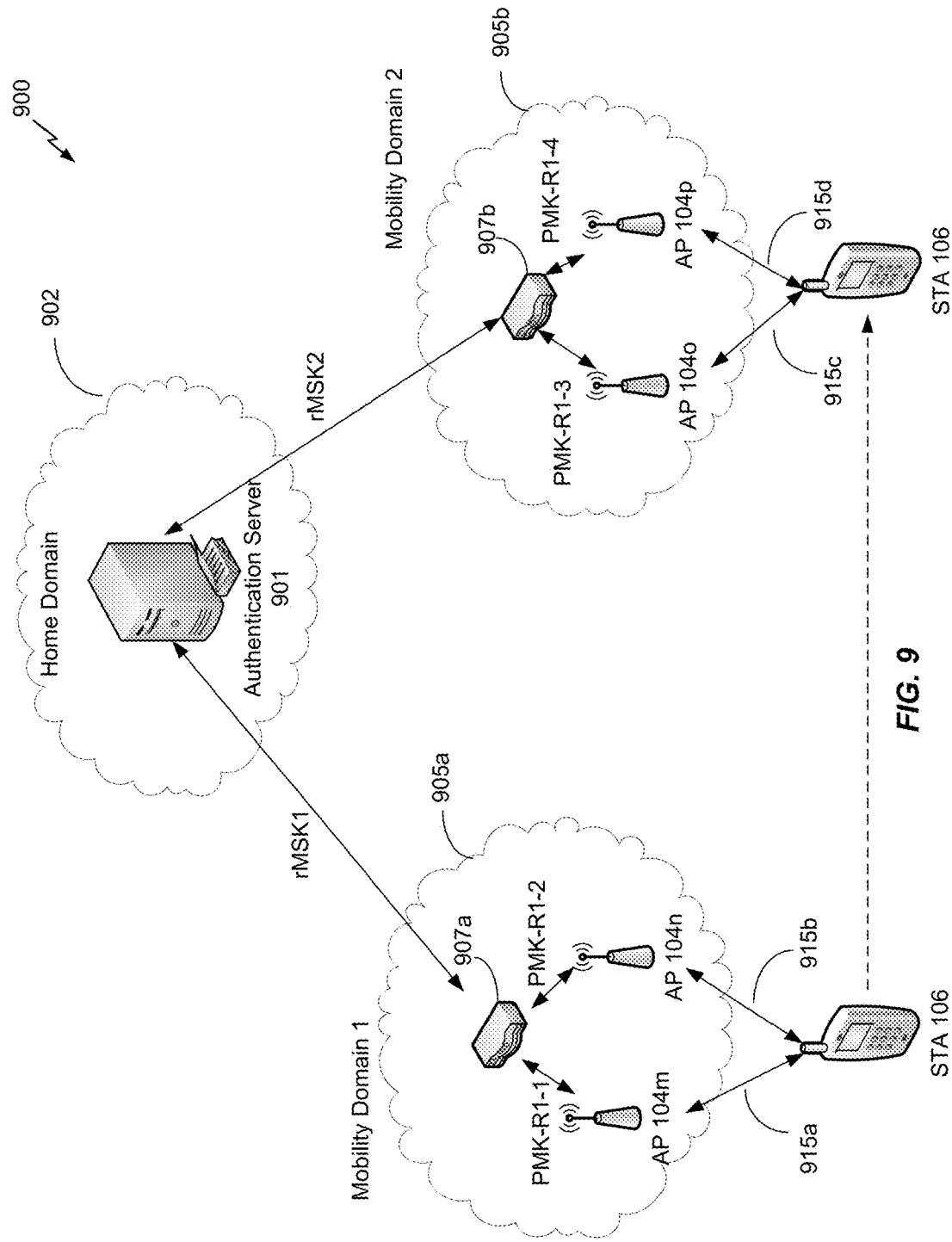
FIG. 9 illustrates message flows between wireless network components in another embodiment of an authentication process when no local ER server is present.

FIG. 9 illustrates message flows between wireless network components in another embodiment of an authentication process. In the authentication method 900, no local ER servers exist within the mobility domains 905a-b. Therefore, instead of the authentication server 901 providing a reauthentication root key to the local ER servers, as shown for example, in FIG. 7 or 8 when the authentications servers 701 and 801 provided the reauthentication root keys rRK1 and rRK2 to local ER servers 806a-b respectively, the authentication server 901 provides a reauthentication master session key rMSK1 and rMSK2 to the key holder devices 907a-b respectively. The key holder devices 907a-b may also be referred to as mobility domain controllers. In some aspects, the key holder devices 907a-b may be the wireless device 202 shown in FIG. 2. The key holder devices 907a-b may then operate similarly to the key holder devices 807a-b described with respect to FIG. 8 above. For example, each of message exchanges 915a and 915c may perform an EAP-RP authentication, while message exchanges 915b and 915d perform a fast basic service set transition (FT) authentication.

In FIG. 9, the message exchange 915a may perform extensible authentication protocol reauthentication protocol (EAP-RP) authentication, as discussed above with respect to FIG. 3. Message exchange 915b may, in some aspects, perform fast basic service set transition (FT) authentication, as discussed above with respect to FIG. 4. Similarly, message exchange 915c may perform EAP-RP authentication while message exchange 915d performs FT authentication.

Figure 10:
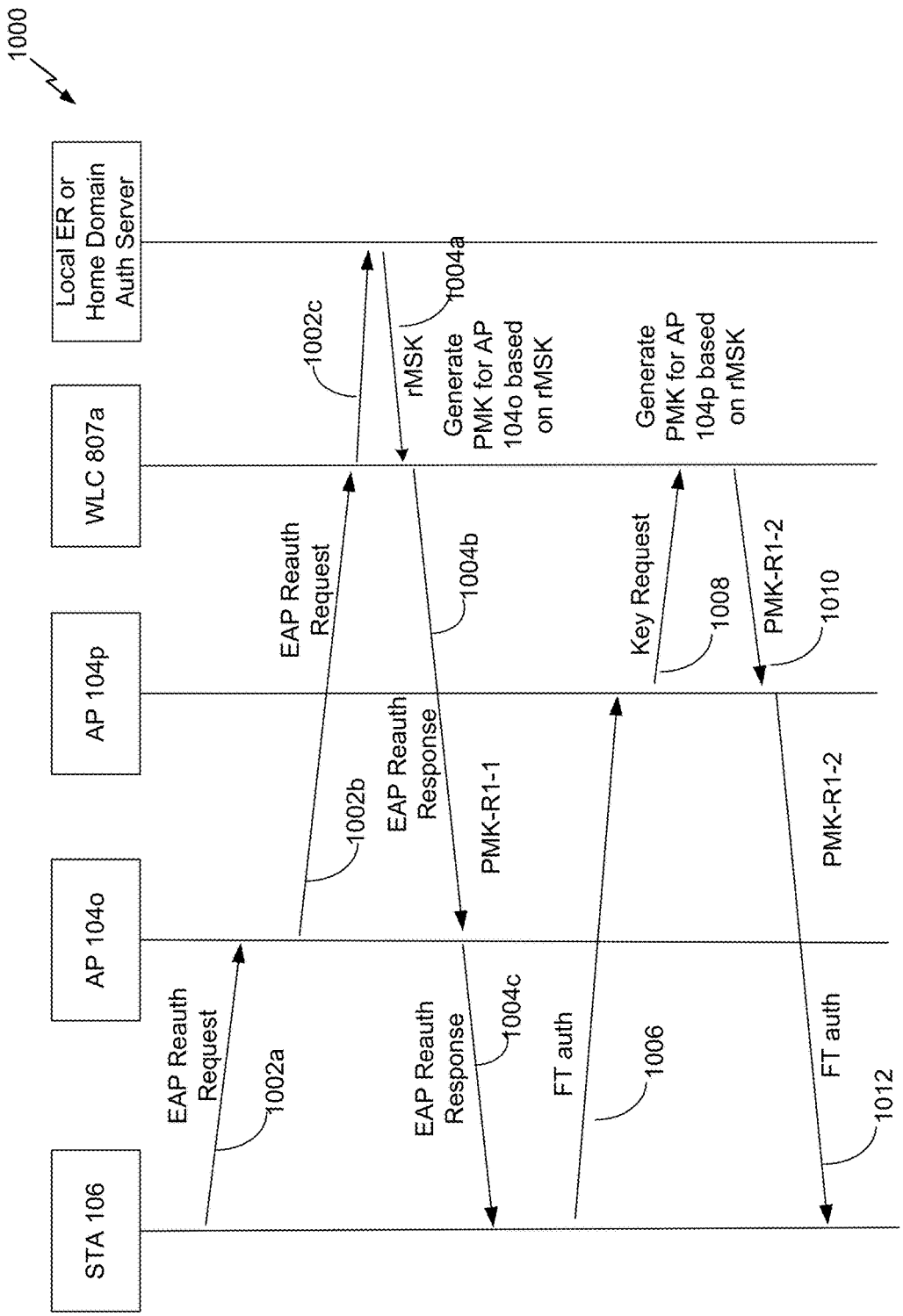
FIG. 10 is a message sequence diagram showing use of authentication message from a first authentication protocol and a second authentication protocol.

FIG. 10 is a message sequence diagram between a wireless station 106, two access points AP 104o-p, a key holder device, in this case a wireless lan controller 807a, and a local ER server, such as local ER server 706a or 706b in FIG. 7, or an authentications server, such as any of authentication servers 801, or 901. In some aspects, the key holder device may be wireless device 202 of FIG. 2. In some aspects, the key holder device may be referred to as a mobility domain controller.

Before the message sequence 1000 occurs, the STA 106 may have performed a full EAP authentication within a first mobility domain with its home authentication server. The AP 104o may be in a second mobility domain different than the first mobility domain. In some aspects, the STA 106 may determine the AP 104o is in the second mobility domain via beacon signals transmitted by the AP 104o. The STA 106 may also determine that its home authentication server is accessible via AP 104o. The STA 106 then transmits an EAP reauthentication request 1002a to AP 104o, indicating its home authentication server. The EAP reauthentication request 1002 may be forwarded by the AP 104o to the wireless lan controller (WLC) 807a as message 1002b. The WLC 807a may transmit the EAP reauthentication request message to a local ER server or the home domain authentication server indicated by the EAP reauthentication request as message 1002c.

In response, the local ER server or the home domain authorization server generates a reauthentication master session key (rMSK) for the STA 106 (shown as "rMSK") and transmits a reauthentication response 1004a to the WLC 807a. The WLC 807a may store the reauthentication master session key (rRK). The WLC 807a then generates a pairwise master key based on the reauthentication master session key (rMSK). The WLC 807a may also generate a second pairwise master key based on the first pairwise master key. In some aspects, the first pairwise master key is a PMK-R0, while the second pairwise master key is a PMK-R1. The WLC 607a then transmits an EAP reauthentication response message 1004b to the AP 104o. The reauthentication response message 1004b may include a PMK, such as the PMK-R1 which is based on the reauthentication master session key received from the local ER server or home domain authentication server. The AP 1040 then forwards the reauthentication to the STA 106 as message 1004c.

Next, the STA 106 transmits a fast basic service set transition (FT) authentication message to the AP 104p. In response, the AP 104p requests a key from the WLC 807a via key request message 1008. The WLC 807a then generates a second PMK for use by the AP 104p for communication with the STA 106. This PMK may be generated based on one or more properties of the STA 106 and/or the AP 104p. This PMK, "PMK-R1-2" is transmitted to the AP 104p in a key response message 1010.

The AP 104p may complete the FT authentication with the STA 106 via message 1012 after receiving the PMK-R1-2 from the WLC 807a.

In some other aspects, the PMK-R1-2" may be proactively generated by the WLC 807a before receipt of the key request message 1008. For example, the PMK-R1-2 may be generated during the EAP-RP exchange 1002/1004 with the STA 106. In some aspects, the PMK-R1-2 may be transmitted to the access point by the WLC 807a even before the FT authentication message 1006 is transmitted by the STA 106.

Figure 11:
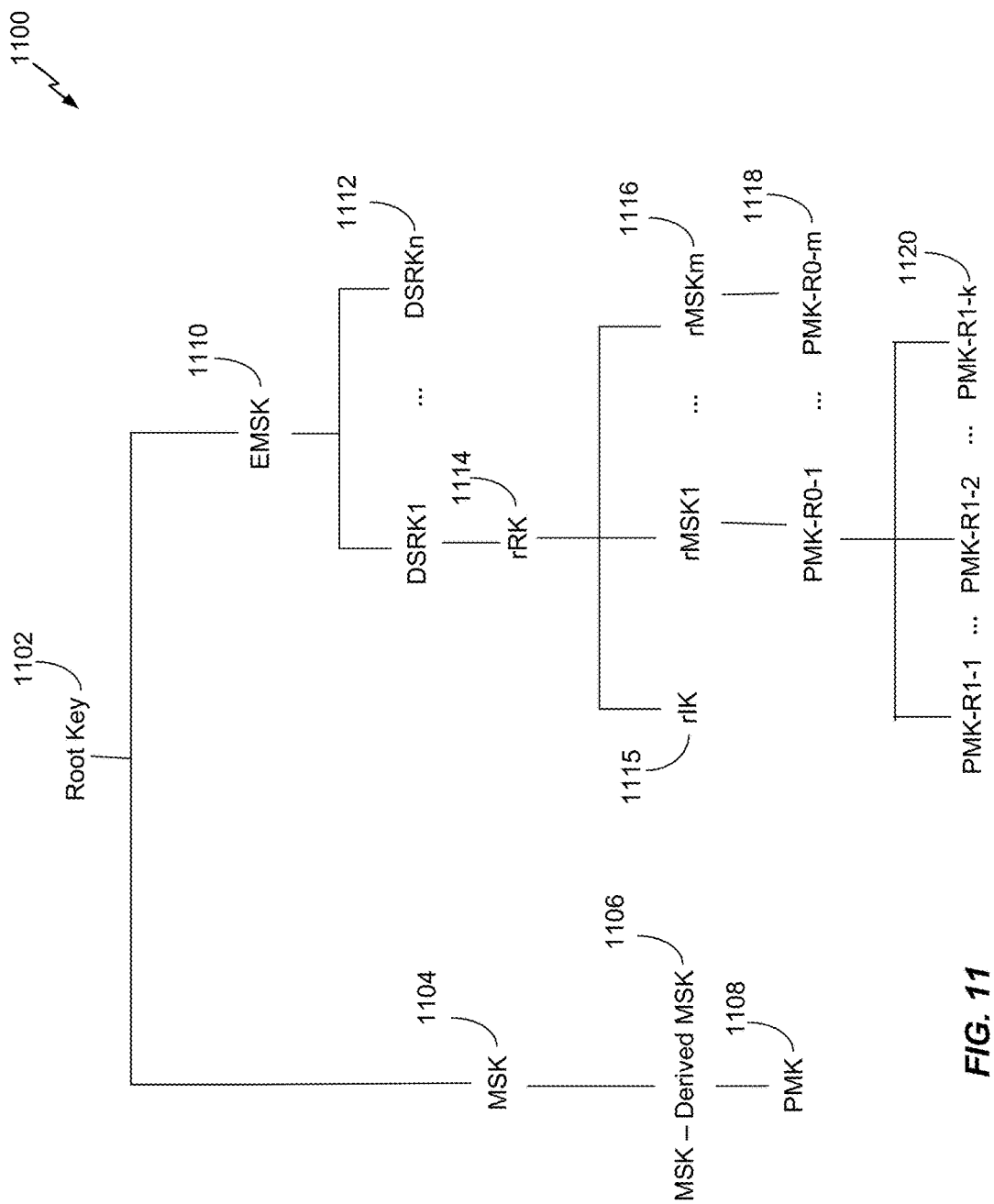
FIG. 11 shows a key hierarchy in an authentication method.

FIG. 11 shows a key hierarchy in an authentication method, such as the authentication method shown in FIGS. 8-10. FIG. 11 shows a root key 1102. A master session key (MSK) 1104 may be derived from the root key 1102. One or more derived master session keys (MSKs) 1106 may be derived from the master session key 1104. A pairwise master key (PMK) 1108 may be derived from the derived master session key 1106.

An extended master session key (EMSK) 1110 may be derived from the root key 1102. In some aspects, the EMSK may be at least 64 bits, and derived as a result of mutual authentication between an STA and authentication server per RFC 3748. In some aspects, the EMSK may be named using an extensible authentication protocol session identifier and a binary or textual indication per RFC 5247. A session identifier may be defined based on the extensible authentication protocol (EAP) method (per RFC 5217 appendix). For EAP-TLS (RFC 5216):

Key_Material=TLS-PRF-128(RK, "client EAP encryption", client.random||server.random) (TLS-PRF-128 produces 1024 bits output)

MSK=Key_Material(0,63) (i.e., higher 512 bits of Key_Material)

EMSK=Key_Material(64,127) (i.e., lower 512 bits of Key_Material) Session-ID=0x0D||client.random||server.random.

where client.random and server.random are the random numbers (32B each) exchanged between server (AS) and client (STA) during authentication, and TLS-PRF-X outputs a X octets (i.e., 8X bits) value and is defined in RFC4346.

One or more domain specific root keys (DSRK) 1112 may be derived from the EMSK 1110. A reauthentication root key 1114 may be derived from one of the domain specific root keys 1112. In some aspects, the derivation of the reauthentication root key 1114 is specified in section 4.1 of RFC 6696. For example, the reauthentication root key may be defined by:

$rRK=KDF(K,S)$, where:

K=EMSK or K=DSRK and
S=rRK Label|"\0"|length

The rRK Label is an IANA-assigned 8-bit ASCII string: EAP Re-authentication Root Key@ietf.org assigned from the "USRK Key Labels" name space in accordance with the policy stated in RFC 5295.

The Key Derivation Function (KDF) and algorithm agility for the KDF are as defined in RFC 5295.

A reauthentication integrity key 1115 may be derived from the reauthentication root key 1114. In some aspects, the reauthentication root key 1114 may be derived as specified in RFC 6696. For example, the rIK may be derived as follows:

$rIK=KDF(K,S)$, where

K=rRK and
S=rIK Label|"\0"|cryptosuite|length

The rIK Label is the 8-bit ASCII string: Re-authentication Integrity Key@ietf.org. The length field refers to the length of the rIK in octets and is encoded as specified in RFC 5295.

One or more reauthentication master session keys (rMSK) 1116 may be derived from a reauthentication root key 1114. In some aspects, a rMSK may be derived according to RFC 6696. For example, the rMSK may be derived as follows:

$rMSK=KDF(K,S)$, where

K=rRK and
S=rMSK Label|"\0"|SEQ|length

The rMSK Label is the 8-bit ASCII string: Re-authentication Master Session Key@ietf.org The length field refers to the length of the rMSK in octets and is encoded as specified in RFC 5295.

As discussed above with respect to FIGS. 8-10, one or more pairwise master keys (PMKs) 1118 may be derived from a reauthentication master session key 1116. As shown in FIG. 11, the pairwise master keys derived from the reauthentication master session key 1116 are PMK-R0 pairwise master keys. One or more second level pairwise master keys 1120 may be derived from a single fast basic service set transition first level PMK 1118. As shown in FIG. 11, the fast basic service set transition second level pairwise master keys 1120 are PMK-R1 pairwise master keys. In any of the key derivations discussed above, a HMAC-SHA-256 may be used as a default key derivation function (KDF).

Figure 12:
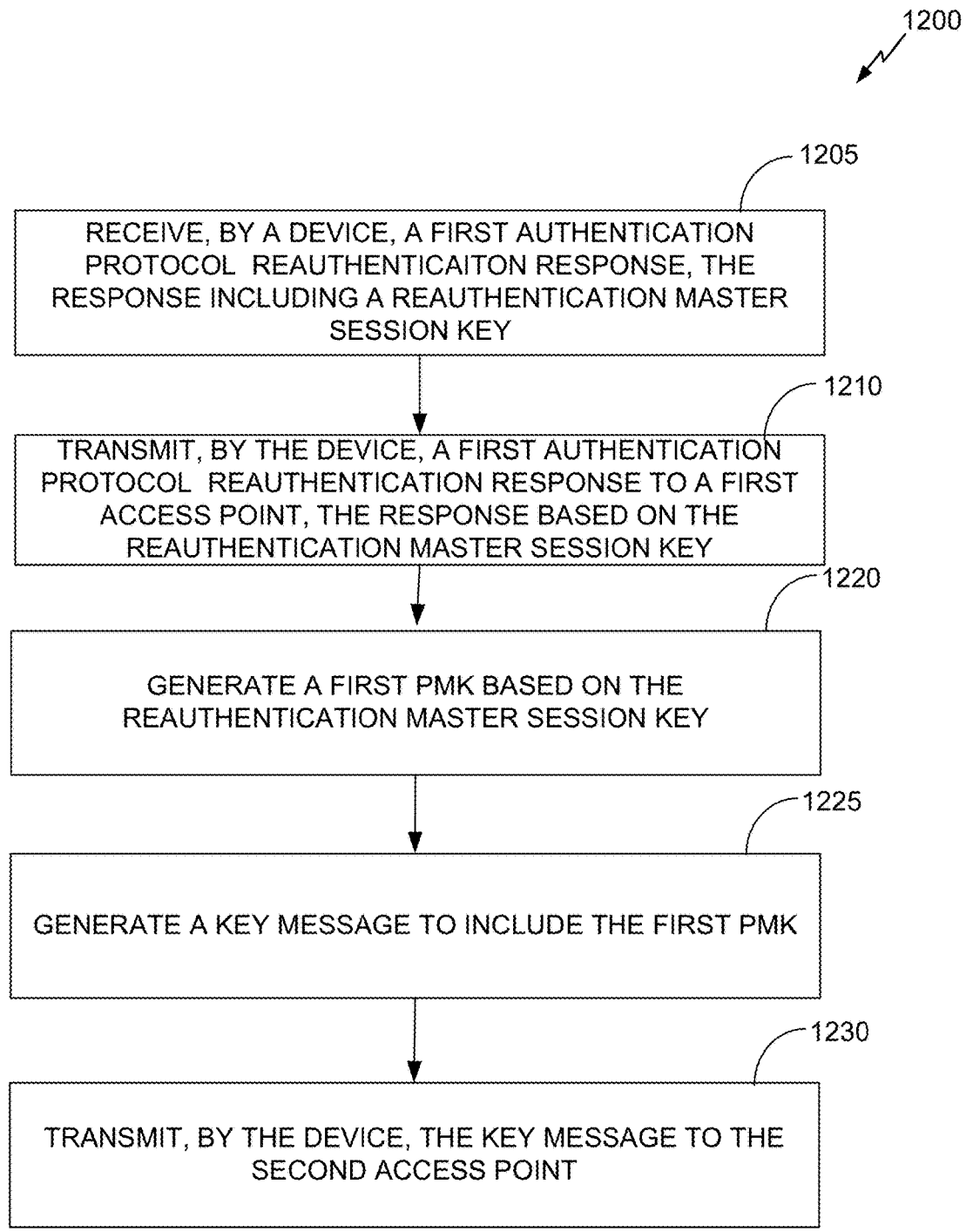
FIG. 12 is a flowchart of a method of authenticating a device.

FIG. 12 is a flowchart of a method of authenticating a device. In some aspects, the method 1200 may be performed by the wireless LAN controllers described above with respect to FIGS. 7-10, mobility domain controllers, and/or the wireless device 202 of FIG. 2. For example, the method 1200 may be performed by one or more of the local ER server 706a-b of FIG. 7, local ER servers 806a-b and/or separate key holder devices 807a-b of FIG. 8, the key holder devices 907a-b of FIG. 9, or the WLC 807a of FIG. 10. In some aspects, method 1200 is performed by an R0 key holder device as defined in the IEEE 802.11 fast transition key holder architecture.

In some aspects, FIG. 12 may provide for interoperability between two different authentication protocols. For example, a first authentication protocol may provide some advantages over a second authentication protocol. The second authentication protocol may be widely deployed within a wireless network. Deploying the first authentication protocol widely throughout the network may be cost prohibitive and may require a substantial period of time before the deployment can be completed such that the first authentication protocol can be utilized in its entirely. While a second authentication protocol may provide some advantages over the first authentication protocol, deploying the second authentication protocol widely throughout a wireless network may be expensive and may not be accomplished for a substantial period of time in the future. Method 1200 described below may allow some implementations to leverage the benefits of the first authentication protocol, in that the first authentication protocol may already be widely deployed.

The method 1200 utilizes both the first and second authentication protocols to accomplish authentication of a wireless device with two separate access points. By utilizing the hybrid authentication approach via the two authentication protocols, fewer deployments of the second authentication protocol may be necessary to facilitate improved efficiency as compared to a deployment that utilizes the first authentication protocol exclusively to authenticate the first wireless device with the two access points.

In block 1205, a first authentication protocol reauthentication response for a first wireless device is received by a device. In some aspects, the reauthentication response is received from a local ER server, or an authentication server. In some aspects, the first authentication protocol is the extensible authentication protocol reauthentication protocol (EAP-RP). IN some aspects, the reauthentication response may be an EAP Finish/Re-Auth Packet as defined in RFC 6696 in some aspects.

The reauthentication response includes a reauthentication master session key (rMSK). The reauthentication master session key may be decoded from the reauthentication response. The reauthentication master session key may be derived from a reauthentication root key. For example, as shown in FIG. 11, a rMSK 1116 may be derived from a reauthentication root key rRK 1114.

In some aspects, the reauthentication response received in block 1205 from the ER server or authentication server is in response to a first authentication protocol reauthentication request transmitted by the device to the local ER or authentication server. In some aspects, the reauthentication request message may be an EAP Initiate/Re-auth Packet as described in RFC6696. The device may receive a reauthentication request for the wireless device from a first access point. The device may then relay the reauthentication request received from the first access point to the local ER server or a home authentication server indicated by the request.

In some aspects, the device generates a first pairwise master key (PMK) based on the reauthentication master session key included in the reauthentication response. In some aspects, the first PMK is an IEEE PMK-R0, which in some aspects, is a first-level key in an 802.11 fast basic service set transition key hierarchy. A second pair wise master key (PMK) may then be generated based on the first PMK. In some aspects, this second PMK is a second level PMK (i.e., PMK-R1) of a fast transition key holder architecture. In some aspects, the second PMK is generated based on one or more characteristics of the wireless device and/or the first access point. In some aspects, block 1205 may be performed by the receiver 212 of wireless device 202.

In block 1210, a first authentication protocol reauthentication response is transmitted to the first access point. In some aspects, the reauthentication response may be a EAP Finish/Re-Auth packet as described in IETF RFC 6696. The first authentication protocol reauthentication response is based on the reauthentication master session key (rMSK), for example, the response may include or otherwise indicate the rMSK or data derived from the rMSK. In some aspects, the first authentication protocol reauthentication response is based on the reauthentication master session key because it includes a PMK, such as the second level PMK (i.e., PMK-R1) discussed above, derived from another PMK, such as a IEEE 802.11 Fast BSS Transition (FT) first level PMK (e.g. PMK-R0), which is derived from the reauthentication master session key. In some aspects, block 1210 may be performed by the transmitter 210 of wireless device 202.

In some aspects, a key request message for communication between a second access point and a wireless device is received from the second access point. In some of these aspects, the key request message is received in response to the second access point receiving a second authentication protocol authentication request for the wireless device. In some aspects the second authentication protocol request is an IEEE 802.11 fast basic service set (BSS) transition (FT) authentication request, for example, as described above with respect to FIG. 4. In some aspects, the second authentication protocol is IEEE 802.11 authentication using the open system authentication algorithm. In some other aspects, the second authentication protocol authentication is IEEE 802.11 authentication using simultaneous authentication of equals (SAE).

In block 1220, a pairwise master key (PMK) is generated. The PMK generated in block 1220 may be based on the reauthentication master session key (rMSK) decoded from the first authentication protocol authentication response received from the ER (or authentication) server in block 1205. In some aspects, the PMK is also generated based on one or more properties of the wireless device and/or the second access point. For example, as discussed above, an IEEE 802.11 Fast BSS Transition (FT) first level PMK (i.e., PMK-R0) may be generated based on the reauthentication master session key (rMSK). The PMK generated in block 1220 may be based on the PMK-R0 discussed above (which is based on the reauthentication master session key). Thus, the PMK generated in block 1220 may be considered a second level PMK, since it is generated based on an IEEE 802.11 Fast BSS Transition (FT) first level PMK. The PMK generated in block 1220 may be an IEEE 802.11 fast BSS transition (FT) second level PMK (such as a PMK-R1) in some aspects. While FIG. 12 refers to the PMK generated in block 1220 as a first PMK, with respect to the PMK's discussed above with respect to block 1205-1210, it may be a third PMK. In some aspects, the PMKs discussed above may be generated in accordance with the IEEE 802.11r protocol standard. In some aspects, block 1220 may be performed by the processor 204 of wireless device 202.

In block 1225, a key message is generated to include the PMK generated in block 1220. In some aspects, block 1225 may be performed by the processor 204 of wireless device 202.

In block 1230, the key message is transmitted to the second access point. The PMK generated in block 1225 is used for communication between the wireless device and the second access point. For example, the PMK may be used to encrypt data transmitted between the second access point and the wireless device.

In response to receiving the key message including the PMK for the second access point, the second access point may complete a second authentication protocol with the first wireless device. In some aspects, completing the second authentication protocol includes transmitting a fast basic service set (BSS) transition (FT) authentication response to the first wireless device. In some aspects, the second authentication protocol is an IEEE 802.11 authentication response using either open system authentication algorithm or SAE. In some aspects, block 1230 may be performed by the transmitter 210 of wireless device 202.

Figure 13:
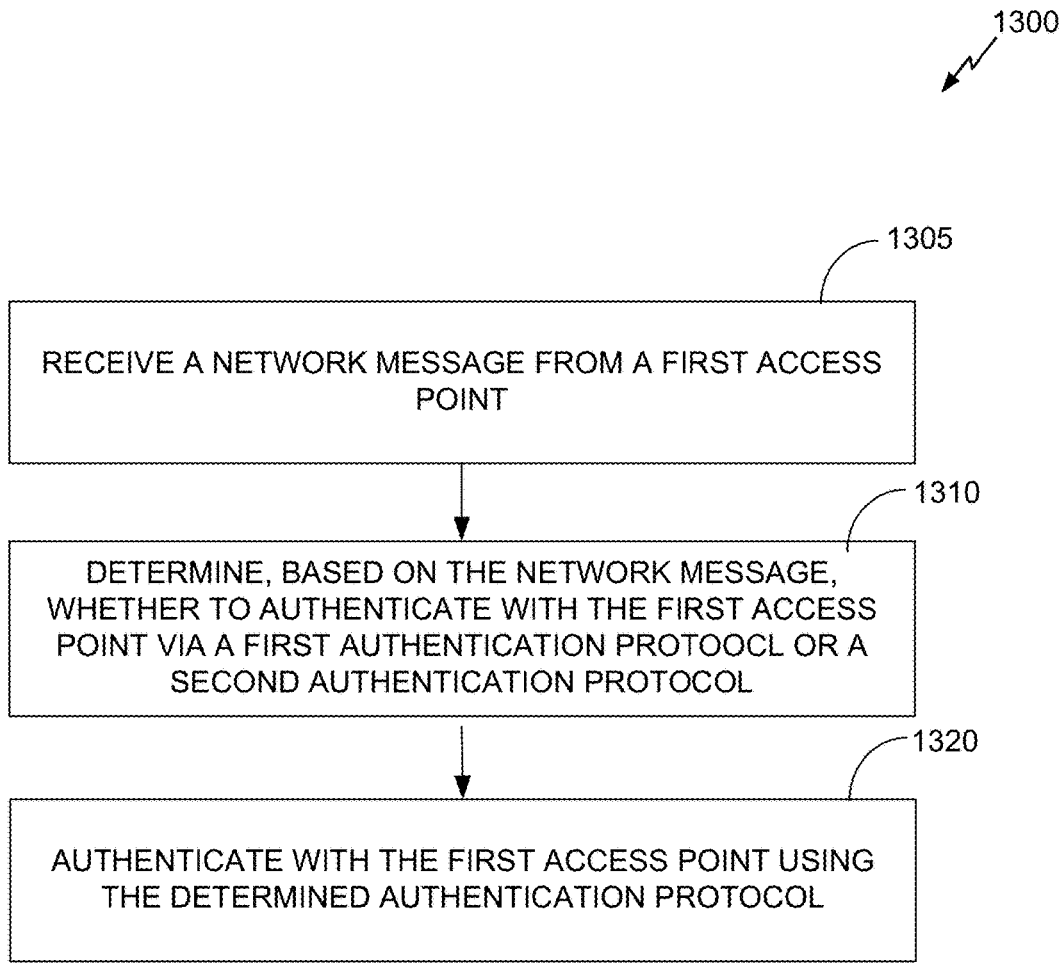
FIG. 13 is a flowchart of a method of authenticating a device.

FIG. 13 is a flowchart of a method of authentication with over a network by a device. In some aspects, the process 1300 may be performed by the station 106 described above. In some aspects, process 1300 may provide for interoperability between two different authentication protocols. For example, a first authentication protocol may provide some advantages over a second authentication protocol. The second authentication protocol may be widely deployed within a wireless network. Deploying the first authentication protocol widely throughout the network may be cost prohibitive and may require a substantial period of time before the deployment can be completed such that the first authentication protocol can be utilized in its entirely. While a second authentication protocol may provide some advantages over the first authentication protocol, deploying the second authentication protocol widely throughout a wireless network may be expensive and may not be accomplished for a substantial period of time in the future. Process 1300 described below may allow some implementations to leverage the benefits of the first authentication protocol, in that the first authentication protocol may already be widely deployed.

As discussed above, in some aspects, a station moving from a first access point to a second access point may stay within the same mobility domain, for example, if the first and second access points are part of the same mobility domain. When this occurs, it may be possible for the station to authenticate with the second access point without performing a full EAP authentication. Instead, if the two access points are within the same mobility domains, the station can authenticate using 802.11 Fast BSS transition authentication.

The process 1300 utilizes both the first and second authentication protocols to accomplish authentication of a wireless device with two separate access points. By utilizing the hybrid authentication approach via the two authentication protocols, fewer deployments of the second authentication protocol may be necessary to facilitate improved efficiency as compared to a deployment that utilizes the first authentication protocol exclusively to authenticate the first wireless device with the two access points.

In block 1305, a message is received from a first access point over a network by an authenticating device. The message may indicate one or more authentication protocols supported by the first access point. For example, in some aspects, a capabilities list included in the message may indicate whether the first access point supports a first and/or a second authentication protocol. For example, the message may indicate whether the first access point supports IEEE 802.11 Fast BSS Transition (FT) authentication, and/or whether the first access point supports EAP (including EAP-RP) authentication. In some aspects, block 1305 may be performed by the receiver 212 and/or the processor 204.

In block 1310, a determination is made, by the authenticating device, whether to authenticate with the first access point via a first authentication protocol or a second authentication protocol based on the message received in block 1310. In some aspects, the authenticating device may prioritize authentication methods found to be supported by the access point. In some aspects, if a first authentication protocol is supported, the device may select the first authentication protocol. In some other implementations, the prioritization may be different, whereas in the same situation the second authentication protocol is supported.

In some aspects, the network message may indicate a mobility domain identifier, indicating which mobility domain the first access point is associated with. Some aspects of block 1310 also include authenticating with a second access point, and receiving a message from the second access point indicating a second mobility domain identifier of the second access point. In some aspects, the authenticating device also authenticates with the second access point. The authenticating device may then move physical locations, and authenticate with the first access point. In some aspects, if the mobility domain of the first access point (which the authenticating device communicates with after previously authenticating with the second access point) is in a different second mobility domain than the second access point, the device may determine to perform an EAP-RP authentication with the first access point.

In contrast, if the mobility domains of the two access points are the same, the authenticating device may utilize IEEE 802.11 Fast BSS Transition (FT) authentication to authenticate with the first access point.

In some aspects, the determination may be based on additional factors besides the network message. For example, in some aspects, if a period of time since a full EAP authentication has been performed by the device performing process 1300 exceeds a time threshold, then a full EAP authentication may be performed with the first access point, regardless of whether other authentication protocols are indicated to be supported by the first access point via the network message. In addition, if the authenticating device has never been authenticated with an access point then a full EAP authentication may be performed regardless of indications in the network message. In some aspects, one or more of the functions discussed above with respect to block 1310 may be performed by the processor 204.

In block 1320, the authenticating device authenticates with the first access point using the determined authentication protocol. Thus, in some aspects, block 1320 performs an IEEE 802.11 Fast BSS transition (FT) authentication message exchange with the first access point, for example, as described above with respect to FIG. 4. In some aspects, the authenticating device authenticates with the first access point using EAP (and/or EAP-RP) authentication, as described above for example in FIG. 3.

Using EAP-RP authentication, the authenticating device may derive a reauthentication master session key (rMSK). For example, the rMSK may be derived as: rMSK=KDF (K, S) where K=rRK and S=rMSK label|"\0"|SEQ \length. The rMSK label is an 8-bit ASCII string: "Re-authentication Master Session Key@ietf.org." The length field refers to the length of the rMSK in octets. The rRK may be derived from a EMSK or DSRK. Please see RFC 5296 for more details.

The authenticating device may then generate a first fast basic service set transition pairwise master key based on the reauthentication master session key. This first fast basic service set transition pairwise master key may be a first level IEEE fast BSS transition (FT) authentication PMK. In some aspects, the first pairwise master key may be generated in accordance with the generation of a PMK-R0 pairwise master key, as described in the IEEE 802.11 Fast BSS transition protocol standards. A second fast basic service set transition pairwise master key may then be generated based on the first pairwise master key. In some aspects, this second fast basic service set transition pairwise master key may be generated based on one or more properties of the first access point, such as a station address and/or BSS identifier of the first access point. In some aspects, the derived second fast basic service set transition pairwise master key may be an IEEE 802.11 fast BSS transition (FT) second level PMK. The authenticating device may then communicate with the first access point using the second pairwise master key. For example, one or more messages sent to or received from the first access point may be encrypted and/or decrypted respectively using the second pairwise master key or using a key derived from the second pairwise master key, such as a PTK, discussed below.

In some aspects, the authenticating device may generate a third pairwise master key based on the first pairwise master key. This third pairwise master key may be generated in accordance with a PMK-R1 as described in the IEEE 802.11 Fast BSS transition protocol specifications. In other words, the third pairwise master key may be an IEEE 802.11 Fast BSS Transition (FT) second level PMK. The third pairwise master key may also be generated in some aspects based on one or more properties of the second access point, such as a MAC station address of the second access point and/or a BSS identifier of the second access point. Communication with the second access point may be based on the third pairwise master key. For example, messages transmitted and/or received with the second access point may be based on the third pairwise master key, or on a key derived from the third pairwise master key, such as a PTK.

In some aspects, the authenticating device may determine whether perfect forward secrecy (PFS) is required for communication with the first access point. In some aspects, this determination is based on the network message received in block 1305. If it is determined that PFS is required, the authenticating device may perform a diffie-hellman key exchange with the first access point in response to the determining. In some aspects, the Diffie-Hellman key exchange is used to generate a pairwise transient key (PTK). In some aspects, the pairwise transient key may be derived as: PTK=KDF(PMK, ANonce|SNonce|$g^{AB}$) where A is a STA's secret, B is an AP's secret (or vice versa) and $g^{AB}$ is a result of a DH key exchange. Hence, in some aspects, before a STA and an AP derive a PTK, they may exchange $g^A$ and $g^B$, i.e., perform a Diffie-Hellman (DH) key exchange.

In some aspects, the PTK may then be used for communication with the first access point. For example, messages transmitted and or received to/from the first access point may be encrypted and/or decrypted using the PTK. In some aspects, a second PTK may be generated in a similar manner as described above for use in communication (encryption/decryption of messages) with the second access point.

In some aspects, one or more of the functions discussed above with respect to block 1320 may be performed by the processor 204, and, in some aspects, in conjunction with one or more of the receiver 212 and/or transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of authenticating a station in a communications system including a first access point, a second access point, a mobility domain controller, and an authentication server, the method comprising:

transmitting an extensible authentication protocol initiate request;

in response to transmitting the extensible authentication protocol initiate request, receiving at the mobility domain controller, an extensible authentication protocol reauthentication response including a reauthentication master session key, for the station from the authentication server;

in response to receiving the extensible authentication protocol reauthentication response, transmitting, at the mobility domain controller, a second extensible authentication protocol reauthentication response, to the first access point, based on the reauthentication master session key;

generating, at the mobility domain controller, a fast basic service set transition second level pairwise master key for the second access point based on the reauthentication master session key;

generating, at the mobility domain controller, a key message to include the fast basic service set transition second level pairwise master key for the second access point;

transmitting, at the mobility domain controller, the key message to the second access point; and authenticating the station, by the mobility domain controller, in the communications system, in response to each of the transmitting the second extensible authentication protocol reauthentication response to the first access point and the transmitting the key message to the second access point.

2. The method of claim 1, wherein generating the fast basic service set transition second level pairwise master key for the second access point comprises generating a fast basic service set transition first level pairwise master key based on the reauthentication master session key; and generating the fast basic service set transition second level pairwise master key for the second access point based on the fast basic service set transition first level pairwise master key.

3. The method of claim 2, further comprising:
generating, at the mobility domain controller, the fast basic service set transition second level pairwise master key for the first access point based on the fast basic service set transition first level pairwise master key and one or more properties of the first access point; and
generating, at the mobility domain controller, the second extensible authentication protocol reauthentication response to include the fast basic service set transition second level pairwise master key for the first access point.

4. The method of claim 3, further comprising:
receiving, at the mobility domain controller, a key request message from the second access point; and
transmitting, by the mobility domain controller, the fast basic service set transition second level pairwise master key for the second access point to the second access point in response to reception of the key request message.

5. The method of claim 4, wherein the second access point transmits the key request message to the mobility domain controller in response to a fast basic service set transition authentication with the station.

6. The method of claim 1, wherein the reauthentication master session key is derived from the extensible authentication protocol reauthentication response.

7. The method of claim 1, further comprising:
performing a Diffie Hellman key exchange with the first access point;
deriving a pairwise transient key based on the Diffie Hellman key exchange and the fast basic service set transition second level pairwise master key; and
communicating with the first access point based on the derived pairwise transient key.

8. A mobility domain controller for authenticating a station in a wireless communications system including a first access point, a second access point, and an authentication server, the mobility domain controller comprising:
a transmitter configured to transmit an extensible authentication protocol initiate request;
a receiver configured to, in response to the transmission of the extensible authentication protocol initiate request, receive an extensible authentication protocol reauthentication response including a reauthentication master session key, for the station from the authentication server;
the transmitter being further configured to, in response to the reception of the extensible authentication protocol reauthentication response, transmit a second extensible authentication protocol reauthentication response to the first access point based on the reauthentication master session key; and
a processor, coupled to a memory, configured to:
generate a fast basic service set transition second level pairwise master key for the second access point based on the reauthentication master session key, and
generate a key message to include the fast basic service set transition second level pairwise master key for the second access point,
wherein the transmitter is further configured to transmit the key message to the second access point,
the processor being further configured to authenticate the station in the wireless communications system, in response to each of the transmitting the second extensible authentication protocol reauthentication response to the first access point and the transmitting the key message to the second access point.

9. The mobility domain controller of claim 8, wherein the processor is further configured to:
generate the fast basic service set transition second level pairwise master key for the second access point by generating a fast basic service set transition first level pairwise master key based on the reauthentication master session key, and
generate the fast basic service set transition second level pairwise master key for the second access point based on the fast basic service set transition first level pairwise master key and one or more properties of the second access point.

10. The mobility domain controller of claim 9, wherein the processor is further configured to:
generate the fast basic service set transition second level pairwise master key for the first access point based on the fast basic service set transition first level pairwise master key and one or more properties of the first access point, and
generate the second extensible authentication protocol reauthentication response to include the fast basic service set transition second level pairwise master key for the first access point.

11. The mobility domain controller of claim 9, wherein
the receiver is further configured to receive a key request message from the second access point; and
the transmitter is further configured to transmit the fast basic service set transition second level pairwise master key for the second access point to the second access point in response to reception of the key request message.

12. The mobility domain controller of claim 8,
wherein the receiver is further configured to receive an extensible authentication protocol reauthentication request for the station from the first access point, and
wherein the transmitter is further configured to transmit a second extensible authentication protocol reauthentication request for the station in response to the receiver receiving the extensible authentication protocol reauthentication request for the station from the first access point.

13. The mobility domain controller of claim 8, wherein the reauthentication master session key is derived from the extensible authentication protocol reauthentication response.

14. The mobility domain controller of claim 8, wherein the processor is further configured to:
perform a Diffie Hellman key exchange with the first access point;
derive a pairwise transient key based on the Diffie Hellman key exchange and the fast basic service set transition second level pairwise master key; and
communicate with the first access point based on the derived pairwise transient key.

15. A tangible computer readable storage medium comprising non-transitory instructions that when executed cause a processor to perform a method of authenticating a station in a communications system including a first access point, a second access point, a mobility domain controller, and an authentication server, the method comprising:
transmitting an extensible authentication protocol initiate request;

in response to transmitting the extensible authentication protocol initiate request, receiving, at the mobility domain controller, an extensible authentication protocol reauthentication response including a reauthentication master session key, for the station, from the authentication server;

in response to receiving the extensible authentication protocol reauthentication response, transmitting, at the mobility domain controller, a second extensible authentication protocol reauthentication response to the first access point based on the reauthentication master session key;

generating, at the mobility domain controller, a fast basic service set transition second level pairwise master key for the second access point based on the reauthentication master session key;

generating, at the mobility domain controller, a key message to include the fast basic service set transition second level pairwise master key for the second access point;

transmitting, at the mobility domain controller, the key message to the second access point; and authenticating the station, by the mobility domain controller, in the communications system, in response to each of the transmitting the second extensible authentication protocol reauthentication response to the first access point and the transmitting the key message to the second access point.

16. The medium of claim 15, wherein generating the fast basic service set transition second level pairwise master key for the second access point comprises generating a fast basic service set transition first level pairwise master key based on the reauthentication master session key; and generating the fast basic service set transition second level pairwise master key for the second access point based on the fast basic service set transition first level pairwise master key.

17. The medium of claim 16, the method further comprising:

generating, at the mobility domain controller, the fast basic service set transition second level pairwise master key for the first access point based on the fast basic service set transition first level pairwise master key and one or more properties of the first access point; and generating, at the mobility domain controller, the second extensible authentication protocol reauthentication response to include the fast basic service set transition second level pairwise master key for the first access point.

18. The medium of claim 17, the method further comprising:

receiving, at the mobility domain controller, a key request message from the second access point; and transmitting, by the mobility domain controller, the fast basic service set transition second level pairwise master key for the second access point to the second access point in response to reception of the key request message.

19. The medium of claim 18, wherein the second access point transmits the key request message to the mobility domain controller in response to a fast basic service set transition authentication with the station.

20. The medium of claim 15, the method further comprising:

performing a Diffie Hellman key exchange with the first access point;

deriving a pairwise transient key based on the Diffie Hellman key exchange and the fast basic service set transition second level pairwise master key; and communicating with the first access point based on the derived pairwise transient key.

21. An apparatus for authenticating a station in a wireless communications system including a first access point, a second access point, and an authentication server, the apparatus comprising:

means for transmitting an extensible authentication protocol initiate request;

means for, in response to transmitting the extensible authentication protocol initiate request, receiving at the mobility domain controller, an extensible authentication protocol reauthentication response including a reauthentication master session key, for the station from the authentication server;

means for, in response to receiving the extensible authentication protocol reauthentication response, receiving an extensible authentication protocol reauthentication response for the station from the authentication server, the first authentication protocol reauthentication response including a reauthentication master session key;

means for transmitting a second extensible authentication protocol reauthentication response to the first access point based on the reauthentication master session key;

means for generating a fast basic service set transition second level pairwise master key for the second access point based on the reauthentication master session key;

means for generating a key message to include the fast basic service set transition second level pairwise master key for the second access point; and means for transmitting the key message to the second access point.

22. The apparatus of claim 21, further comprising:

means for generating the fast basic service set transition second level pairwise master key for the second access point by generating a fast basic service set transition first level pairwise master key based on the reauthentication master session key; and means for generating the fast basic service set transition second level pairwise master key for the second access point based on the fast basic service set transition first level pairwise master key and one or more properties of the second access point.

23. The apparatus of claim 22, further comprising:

means for generating the fast basic service set transition second level pairwise master key for the first access point based on the fast basic service set transition first level pairwise master key and one or more properties of the first access point; and means for generating the second extensible authentication protocol reauthentication response to include the fast basic service set transition second level pairwise master key for the first access point.

24. The apparatus of claim 22, further comprising:

means for receiving a key request message from the second access point; and means for transmitting the fast basic service set transition second level pairwise master key for the second access point to the second access point in response to reception of the key request message.

25. The apparatus of claim 21, further comprising:

means for receiving an extensible authentication protocol reauthentication request for the station from the first access point; and means for transmitting a second extensible authentication protocol reauthentication request for the station in response to the receiver receiving the extensible authentication protocol reauthentication request for the station from the first access point.

26. The apparatus of claim 21, further comprising:

means for performing a Diffie Hellman key exchange with the first access point;

means for deriving a pairwise transient key based on the Diffie Hellman key exchange and the fast basic service set transition second level pairwise master key; and means for communicating with the first access point based on the derived pairwise transient key.

\* \* \* \* \*